(12) United States Patent  (10) Patent No.: US 8,498,818 B1
Jones, Jr. et al.  (45) Date of Patent: Jul. 30, 2013

(54) SYSTEMS AND METHODS FOR CALCULATING EMISSIONS RESULTING FROM TRANSPORTING A SHIPMENT

(75) Inventors: James Anthony Jones, Jr., Alpharetta, GA (US); Mark Matulevicus, Woodstock, GA (US); David T. Ridley, Alpharetta, GA (US); David Guernsey, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 454 days.

(21) Appl. No.: 12/562,431

(22) Filed: Sep. 18, 2009

Related U.S. Application Data

(60) Provisional application No. 61/106,497, filed on Oct. 17, 2008.

(51) Int. Cl.
*G06F 19/00* (2011.01)
*G06F 11/30* (2006.01)
*G06F 17/40* (2006.01)
*G21C 17/00* (2006.01)

(52) U.S. Cl.
USPC ............... 702/1; 702/22; 702/176; 702/182; 702/187; 235/384

(58) Field of Classification Search
USPC ............... 702/1, 22, 176, 182, 187; 235/384
See application file for complete search history.

(56) References Cited

U.S. PATENT DOCUMENTS

| | | | |
|---|---|---|---|
| 6,115,672 | A | 9/2000 | Caveny et al. |
| 6,636,798 | B2 | 10/2003 | Biess et al. |
| 6,647,328 | B2 | 11/2003 | Walker |
| 6,681,188 | B2 | 1/2004 | Sakurai et al. |
| 6,701,257 | B2 | 3/2004 | Sakurai et al. |
| 6,816,792 | B2 | 11/2004 | Sakurai et al. |
| 6,904,336 | B2 | 6/2005 | Raines et al. |
| 6,965,833 | B2 | 11/2005 | Sakurai et al. |
| 7,117,117 | B2 | 10/2006 | Sakurai et al. |

(Continued)

FOREIGN PATENT DOCUMENTS

EP     1 887 499     2/2008

OTHER PUBLICATIONS

"uShip Makes Shipping Greener Easy; Industry First Program Enables Shippers to Calculate and Balance Their Shipment's Global Warming Impact With American Clean Energy Projects," uShip press release, Jan. 16, 2007, pp. 1-2, PRNewswire at www.uship.com.

(Continued)

*Primary Examiner* — Janet Suglo
(74) *Attorney, Agent, or Firm* — Alston & Bird LLP

(57) ABSTRACT

According to various embodiments, an emissions calculation system calculates the emissions resulting from transporting a shipment that includes an individual or group of packages. In certain embodiments, the calculated emissions are based on estimated amounts of fuel used in the transportation process based on historical fuel usage and shipment data. In addition, various embodiments of the system generate and display (or otherwise make available) one or more reports of the calculated emissions information. For example, the reports may provide a total amount of carbon dioxide emitted for a particular shipment or group of shipments. In addition, the report may provide a breakdown of the amount of emissions resulting from various operational activities in the transportation process (e.g., resulting from pickup, delivery, and/or transportation between carrier facilities, and resulting from stationary operational activities, such as sorting or movement within each carrier facility).

12 Claims, 17 Drawing Sheets

U.S. PATENT DOCUMENTS

| | | | |
|---|---|---|---|
| 7,117,768 | B1 | 10/2006 | Stoeppelwerth |
| 7,197,397 | B2 | 3/2007 | Matsuda et al. |
| 7,343,341 | B2 | 3/2008 | Sandor et al. |
| 2001/0056544 | A1 | 12/2001 | Walker |
| 2002/0062594 | A1 | 5/2002 | Erickson |
| 2002/0143693 | A1 | 10/2002 | Soestbergen et al. |
| 2002/0173979 | A1 | 11/2002 | Daggett et al. |
| 2002/0173980 | A1 | 11/2002 | Daggett et al. |
| 2003/0105832 | A1 | 6/2003 | Kaneko |
| 2003/0221118 | A1 | 11/2003 | Walker |
| 2004/0039684 | A1 | 2/2004 | Sandor |
| 2004/0049324 | A1 | 3/2004 | Walker |
| 2004/0088179 | A1 | 5/2004 | Cogen et al. |
| 2004/0093264 | A1 | 5/2004 | Shimizu |
| 2004/0117240 | A1 | 6/2004 | Ness et al. |
| 2005/0154669 | A1 | 7/2005 | Streetman |
| 2005/0209905 | A2 | 9/2005 | Ness et al. |
| 2006/0089851 | A1 | 4/2006 | Silby et al. |
| 2006/0161450 | A1 | 7/2006 | Carey et al. |
| 2006/0265230 | A1 | 11/2006 | Shisa |
| 2006/0287783 | A1 | 12/2006 | Walker |
| 2007/0255457 | A1 | 11/2007 | Whitcomb et al. |
| 2008/0040182 | A1* | 2/2008 | Wegner et al. .................... 705/8 |
| 2009/0187493 | A1 | 7/2009 | Whiteman |
| 2009/0210295 | A1 | 8/2009 | Edholm et al. |
| 2009/0292617 | A1* | 11/2009 | Sperling et al. ................. 705/26 |

OTHER PUBLICATIONS

"Carbonfund.org Pioneers Carbonfree™ Shipping," Carbonfund.org, Nov. 16, 2006, pp. 1-2, www.carbonfund.org.

Putt Del Pino & Bhatia; "Working 9 to 5 on Climate Change: An Office Guide," WRI Report, Dec. 2002, pp. 1-62, World Resources Institute.

Carboncounter.org webpage of Nov. 18, 2004, "Home CO2 Emissions," p. 1, CarbonCounter.org (retrieved via web.archive.org).

Gruner, "Plant a Tree, Save the Planet?—Polluters Jump at a Chance for 'Carbon Credits'—Critics Call Web Site's Plan a 'Quick Fix' That Hurts the Environment," Wall Street Journal Europe, Nov. 15, 2000, pp. 1-2 (original print in section E-People on p. 23).

"The Climate Trust 2003-2004 annual report", The Climate Trust (publication date unknown), pp. 1-9.

Dushoff, "A License to Pollute," The Multinational Monitor, Mar. 1990, pp. 1-4, http://multinationalmonitor.org.

Munksgaard, et al., "Impact of Household Consumption on CO2 emissions," Energy Economics, 2000, pp. 423-440, www.elsevier.com/locate/eneco.

Grinnell & Hunt III, "Gifted Pollution Allowances: Recognizing a Liability to Society," Critical Perspectives on Accounting, 2002, pp. 211-228.

Bin & Dowlatabadi, "Consumer lifestyle approach to US energy use and the related CO2 emissions," Energy Policy, 2005, pp. 197-208, www.elsevier.com/locate/enpol.

Taiyab, "The Market for Voluntary Carbon Offsets: A New Tool for Sustainable Development?", International Institute for Environment and Development, Gatekeeper Series 121, 2005, pp. 2-24.

Mieszkowski, "Paying off our global warming sins," May 26, 2006, Salon.com article, pp. 1-11 (4 Internet pages shown on 11 printed pages).

Various authors and articles, Chicago Climate Exchange Quarterly, Fall 2005, vol. ii, Issue ii, pp. 1-12, chicagoclimateexchange.com.

Various authors and articles, Chicago Climate Exchange Quarterly, Summer 2004, vol. 1, Issue 1, pp. 1-4.

"TerraPass—Reduce your carbon emissions from your car, fight climate change," www.terrapass.com webpage of Feb. 9, 2005, p. 1, retrieved via http://web.archive.org.

"Readiness to Accept Increases in Energy Costs," WorldPublicOpinon.org, Oct. 15, 2007, pp. 1-5, http://www.americans-world.org/digest/global_issues/global_warming/gw5.cfm.

"Carbon Calculator," www.carboneutralcalculator.com/myfootprint.aspx, publication date unknown (viewed Oct. 21, 2009), p. 1.

Carboncounter.org webpage of Feb. 6, 2005, "Fight Climate Change," p. 1, CarbonCounter.org (retrieved via web.archive.org).

Carboncounter.org webpage of Feb. 6, 2005, "Frequently Asked Questions," pp. 1-3, CarbonCounter.org (retrieved via web.archive.org).

BP—Non-Flash Carbon Footprint Calculator, http://www.bp.com/carboncalculator.do?categoryId=9024878&contentId=7046374, publication date unknown (viewed on Oct. 27, 2009), pp. 1-4.

* cited by examiner

Active Emissions Calculation Database

Table A

| Zones \ Modes | 2 | 3 | ... | 8 | |
|---|---|---|---|---|---|
| Truck | Cube-hours | Cube-hours | Cube-hours | 0 | Diesel |
| Air | 0 | Cube-hours | Cube-hours | Cube-hours | Jet-fuel |
| Rail | 0 | Cube-hours | Cube-hours | 0 | Diesel |

Table B

| Zones \ Modes | 2 | 3 | ... | 8 | |
|---|---|---|---|---|---|
| Truck | Gallons | Gallons | Gallons | 0 | Diesel |
| Air | 0 | Gallons | Gallons | Gallons | Jet-fuel |
| Rail | 0 | Gallons | Gallons | 0 | Diesel |

Table C

| Zones \ Modes | 2 | 3 | ... | 8 | |
|---|---|---|---|---|---|
| Truck | Gallons/cube | Gallons/cube | Gallons/cube | 0 | Diesel |
| Air | 0 | Gallons/cube | Gallons/cube | Gallons/cube | Jet-fuel |
| Rail | 0 | Gallons/cube | Gallons/cube | 0 | Diesel |

FIGURE 7B

Active Emissions Calculation Database

*Table D*

| Route leg | 1 | 2 | ... | n | |
|---|---|---|---|---|---|
| Origin 1 | Cube-hours | Cube-hours | Cube-hours | Cube-hours | Destination 1 |
| Origin 2 | Cube-hours | Cube-hours | Cube-hours | Cube-hours | Destination 2 |
| Origin 3 | Cube-hours | Cube-hours | Cube-hours | Cube-hours | Destination 2 |

*Table E*

GND / 2DA / NDA

OD Pair | Cube-hour | Fuel

Total fuel (from ledger)

*Table F*

GND / 2DA / NDA

OD Pair | Cube-hour | Fuel | Fuel/cube

Total fuel (from ledger)

FIGURE 8B

Active Emissions Calculation Database — 33

Table G

| | Pickup | Delivery |
|---|---|---|
| Ground | Number of stops | Number of stops |
| 2 Day Air | Number of stops | Number of stops |
| Next Day Air | Number of stops | Number of stops |

Table H

| | Pickup | Delivery |
|---|---|---|
| Ground | Total Time | Total Time |
| 2 Day Air | Total Time | Total Time |
| Next Day Air | Total Time | Total Time |

Table I

| | Pickup | Delivery |
|---|---|---|
| Ground | Total Fuel | Total Fuel |
| 2 Day Air | Total Fuel | Total Fuel |
| Next Day Air | Total Fuel | Total Fuel |

Table J

| | Pickup | Delivery |
|---|---|---|
| Ground | Fuel Use per (stop X vol.) | Fuel Use per (stop X vol.) |
| 2 Day Air | Fuel Use per (stop X vol.) | Fuel Use per (stop X vol.) |
| Next Day Air | Fuel Use per (stop X vol.) | Fuel Use per (stop X vol.) |

FIGURE 9B

SYSTEMS AND METHODS FOR CALCULATING EMISSIONS RESULTING FROM TRANSPORTING A SHIPMENT

CROSS REFERENCE TO RELATED APPLICATIONS

This patent application claims priority to U.S. Provisional Application No. 61/106,497 entitled "Systems and Methods for Calculating Carbon Emissions of a Shipment" and filed Oct. 17, 2008, which is herein incorporated by reference in its entirety.

BACKGROUND OF THE INVENTION

As awareness of environmental issues has grown, logistics, supply chain, and shipping customers have become increasingly concerned with the impact of their transportation activities on the environment. Many customers are now requesting reports on the carbon footprint of their shipments, which they may use as gauges for purchasing carbon credits and for monitoring their environmental impact. Currently, transportation companies calculate the carbon dioxide emissions of shipments based on estimates of a given shipment's weight and the distance it is transported. In particular, standard emissions factors, such as those provided by the World Resources Institute (WRI), are applied to weight and distance statistics to estimate carbon dioxide emissions. These calculations are currently done manually and can take a significant amount of time to complete. In addition, the distance estimates and standard emissions factors used in the calculations do not take into account the efficiencies in the transportation process established by a transportation company.

Accordingly, there is a need in the art for an improved system and method for calculating the emissions resulting from transporting a shipment through a transportation network.

BRIEF SUMMARY OF VARIOUS EMBODIMENTS OF THE INVENTION

According to various embodiments of the invention, an emissions calculation system calculates emissions resulting from transporting a shipment from an origin address to a destination address through a carrier's transportation network. The emissions calculation system includes at least one computer processor and a memory, and the at least one computer processor is configured for: (1) receiving at least a portion of shipment parameters associated with a particular shipment, the received shipment parameters comprising an origin address and a destination address for the particular shipment; (2) identifying a transportation path along which the particular shipment is expected to travel from the origin address to the destination address; (3) retrieving one or more emissions factors related to at least one of the shipment parameters, each of the one or more emissions factors being based at least in part on an amount of fuel used during a particular time period by the carrier to transport previously shipped packages along at least a portion of the transportation path; and (4) estimating an amount of emissions resulting from transporting the particular shipment along the at least a portion of the transportation path based at least in part on the one or more retrieved emissions factors and at least a portion of the shipment parameters.

In certain embodiments, the at least one computer processor is further configured for estimating the amount of fuel used during the particular time period to transport packages along the at least a portion of the transportation path based at least in part on an expected amount of time for transporting the packages along the at least a portion of the transportation path, and the expected amount of time based on historical shipment data of the carrier.

According to other various embodiments, an emissions calculation system calculates emissions factors used to estimate emissions resulting from transporting a particular shipment from an origin carrier facility to a destination carrier facility through a carrier's transportation network. The emissions calculation system includes at least one computer processor and a memory, and the at least one computer processor configured for: (A) retrieving data comprising: (1) an amount of time expected for transporting a package along at least a portion of a transportation path between the origin carrier facility and the destination carrier facility, the at least a portion of the transportation path having a distance that is within a distance range and (2) a number of packages transported by the carrier within the distance range during a particular time period via a mode of transportation; (B) allocating a portion of a total amount of fuel used by the carrier during the particular time period for transporting the number of packages within the distance range via the mode of transportation, the allocated portion of fuel being based on at least the amount of time expected for transporting the package along the at least a portion of the transportation path, the number of packages transported by the carrier within the distance range; and (C) calculating an amount of emissions for transporting the number of packages based on the allocated amount of fuel.

In other various embodiments, an emissions calculation system calculates emissions factors used to estimate emissions resulting from transporting a particular shipment from an origin carrier facility to a destination carrier facility through a carrier's transportation network. The emissions calculation system includes at least one computer processor and a memory, and the at least one computer processor configured for: (A) retrieving data comprising: (1) an amount of time expected for transporting a package along at least a portion of a transportation path between the origin carrier facility and the destination carrier facility, the at least a portion of the transportation path being a route leg, and (2) a number of packages transported by the carrier along the route leg during a particular time period via a mode of transportation; (B) allocating a portion of a total amount of fuel used by the carrier during the particular time period for transporting the number of packages along the route leg via the mode of transportation, the allocated portion of fuel being based on the amount of time expected for transporting the package along the route leg, and the number of packages transported by the carrier along the route leg; and (C) calculating an amount of emissions for transporting the number of packages based on the allocated amount of fuel.

According to various other embodiments, an emissions calculation system calculates emissions factors used to estimate emissions resulting from picking up a particular shipment in a carrier's transportation network. The emissions calculation system comprises at least one computer processor and a memory, and the at least one computer processor configured for: (A) retrieving data comprising: (1) a number of stops made by the carrier during a particular time period for picking up packages associated with a service product, (2) a number of packages associated with the service product that were picked up by the carrier during the particular time period, and (3) an amount of time expected per stop for picking up packages associated with the service product; (B) allocating a portion of a total amount of fuel used by the carrier during the particular time period for picking up the number of packages associated with the service product, the allocated portion of fuel being based on at least a portion of the retrieved data; and (C) calculating an amount of emissions per stop associated with picking up packages associated with the service product based on the allocated amount of fuel per stop.

In other various embodiments, an emissions calculation system calculates emissions factors used to estimate emissions resulting from delivering a particular shipment in a carrier's transportation network. The emissions calculation system includes at least one computer processor and a memory, and the at least one computer processor configured for: (A) retrieving data comprising: (1) a number of stops made by the carrier during a particular time period for delivering packages associated with a service product, (2) a number of packages associated with the service product that were delivered by the carrier during the particular time period, and (3) an amount of time expected per stop for delivering packages associated with the service product; (B) allocating a portion of a total amount of fuel used by the carrier during the particular time period for delivering the number of packages associated with the service product, the allocated portion of fuel being based on at least a portion of the retrieved data; and (C) calculating an amount of emissions per stop associated with delivering packages associated with the service product based on the allocated amount of fuel per stop.

BRIEF DESCRIPTION OF DRAWINGS

Figure 1:
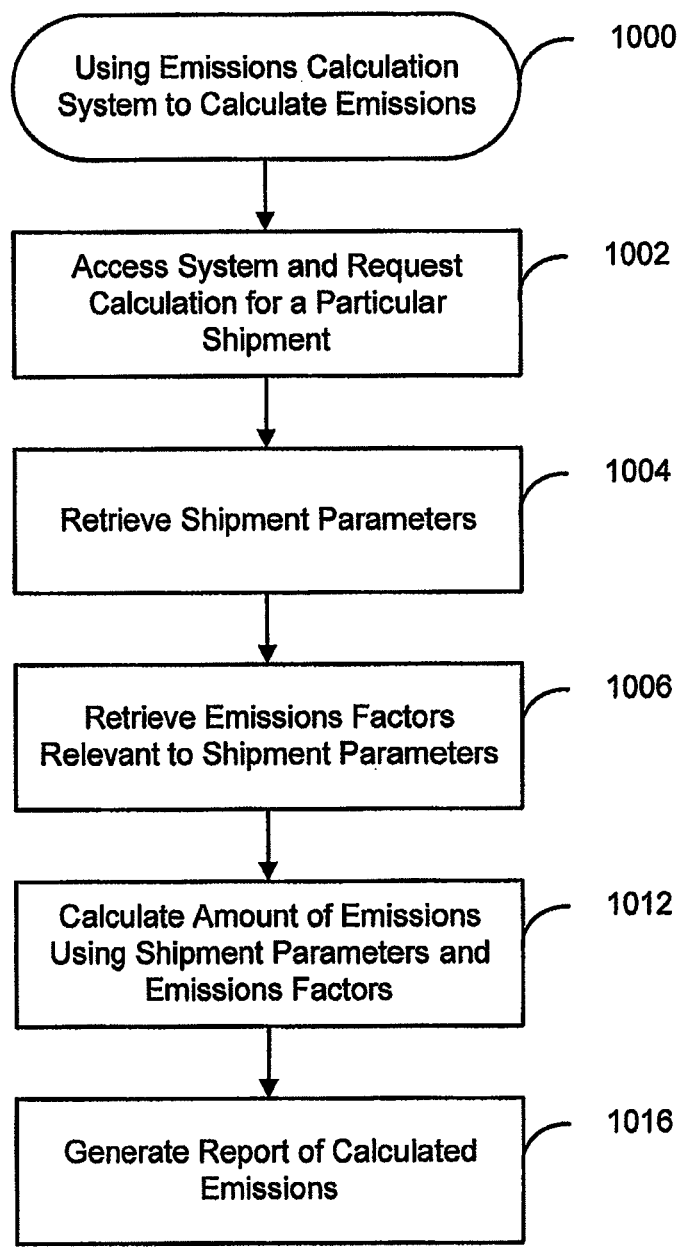

Having thus described various embodiments of the invention in general terms, reference will now be made to the accompanying drawings, which are not necessarily drawn to scale, and wherein:

FIG. 1 is an exemplary flow diagram of a method of using an emissions calculation system to calculate carbon dioxide emissions according to one embodiment.

Figure 2:
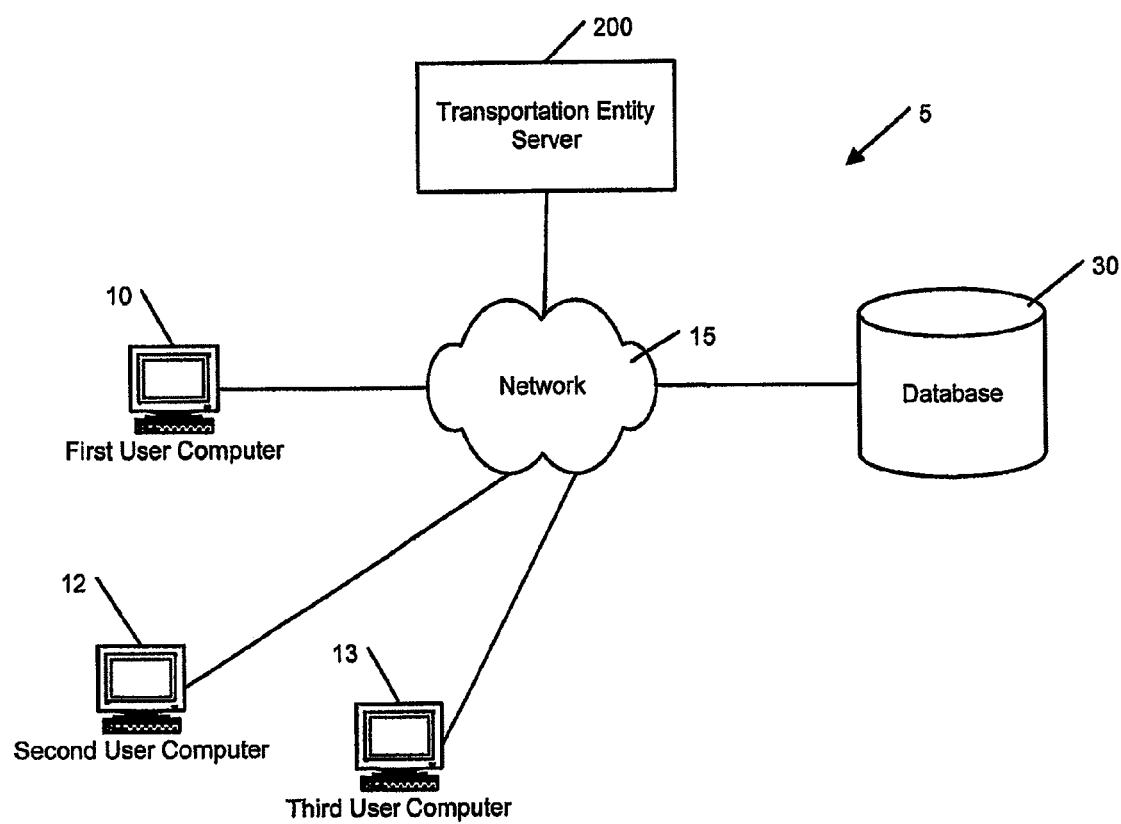

FIG. 2 is a simplified block diagram illustrating an emissions calculation system according to various embodiments.

Figure 3:
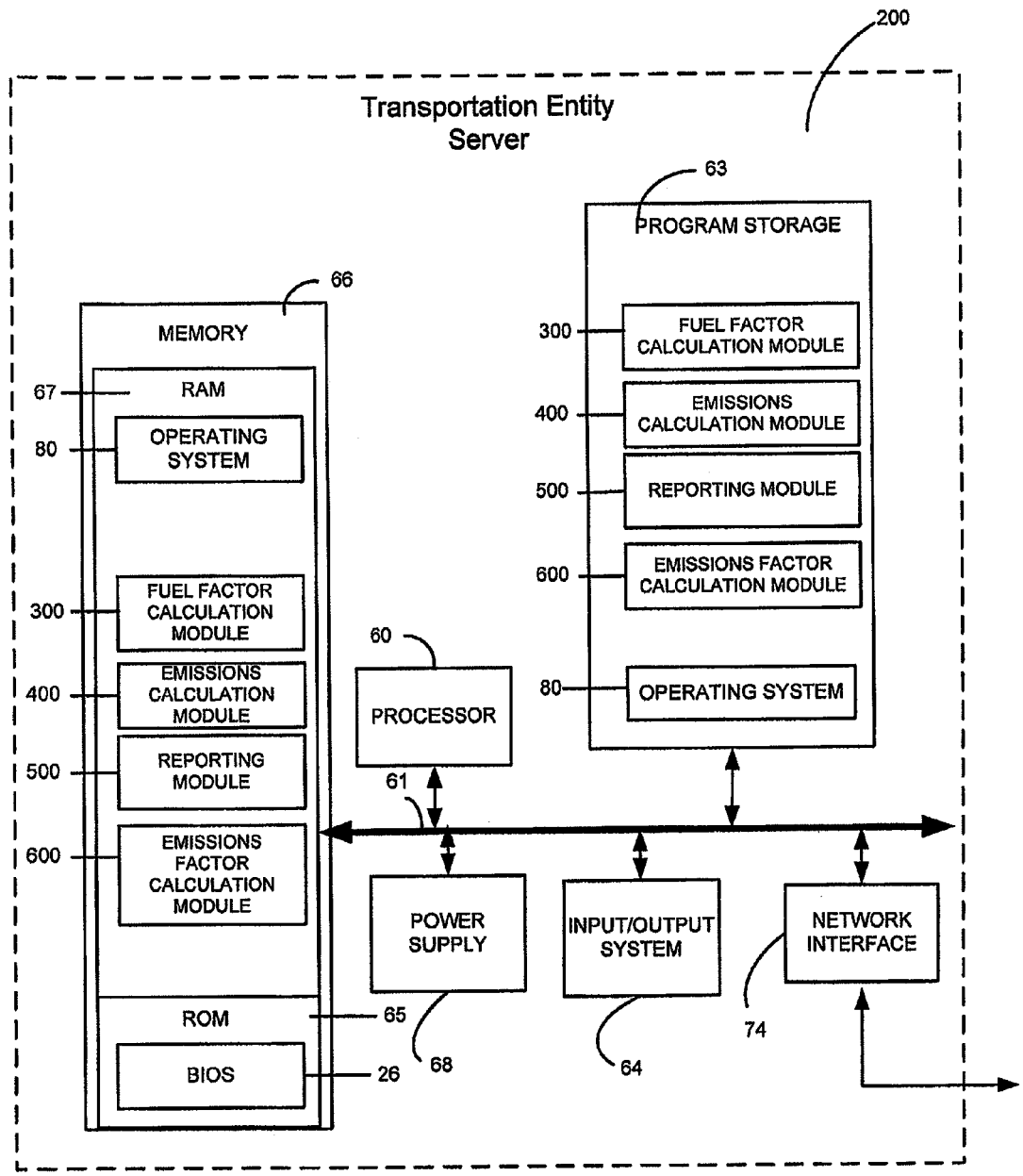

FIG. 3 is a schematic diagram of the transportation entity server shown in FIG. 2 according to various embodiments.

Figure 4:
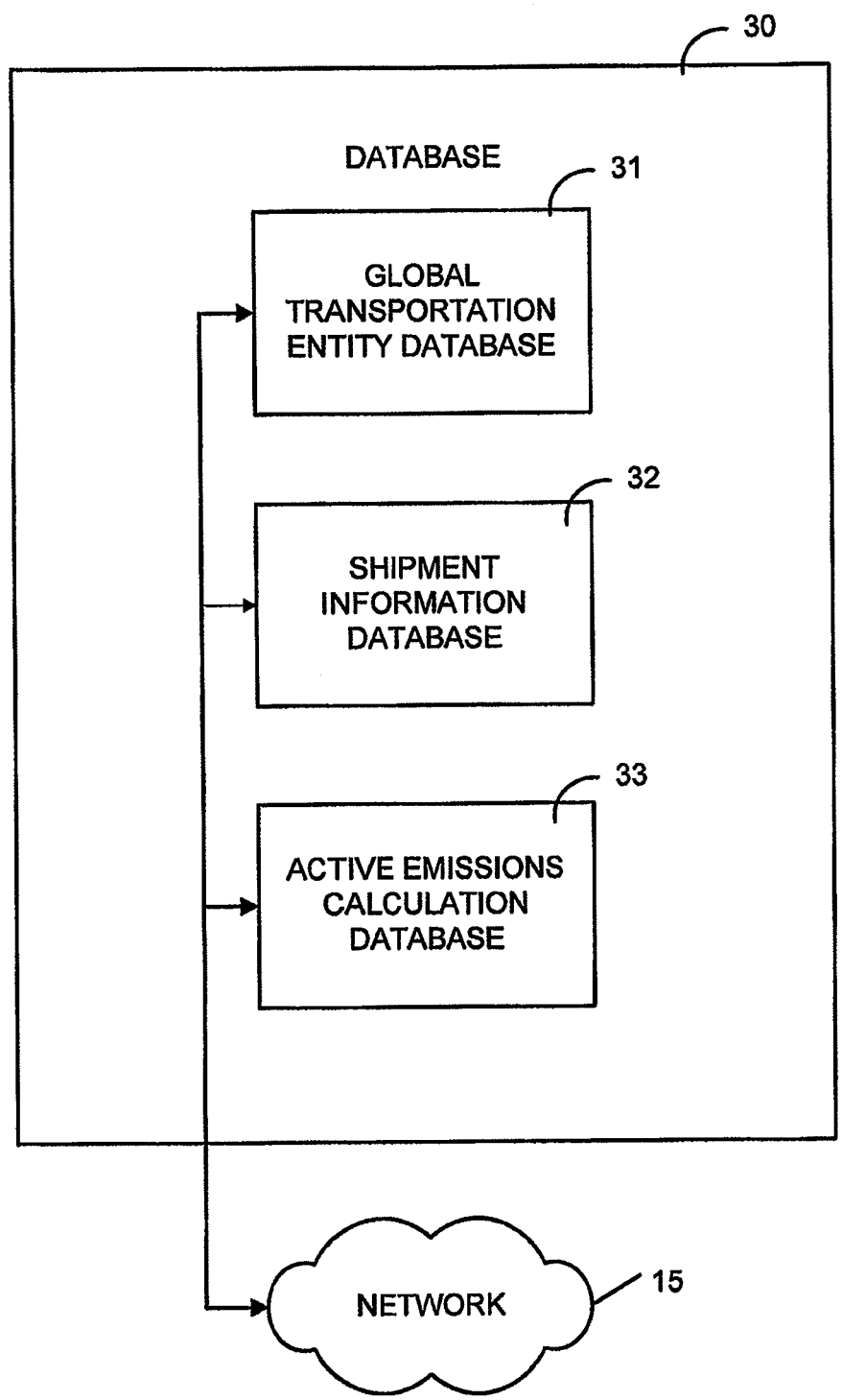

FIG. 4 is a diagram of various databases networked in the emissions calculation system shown in FIG. 2 according to one embodiment.

Figure 5:
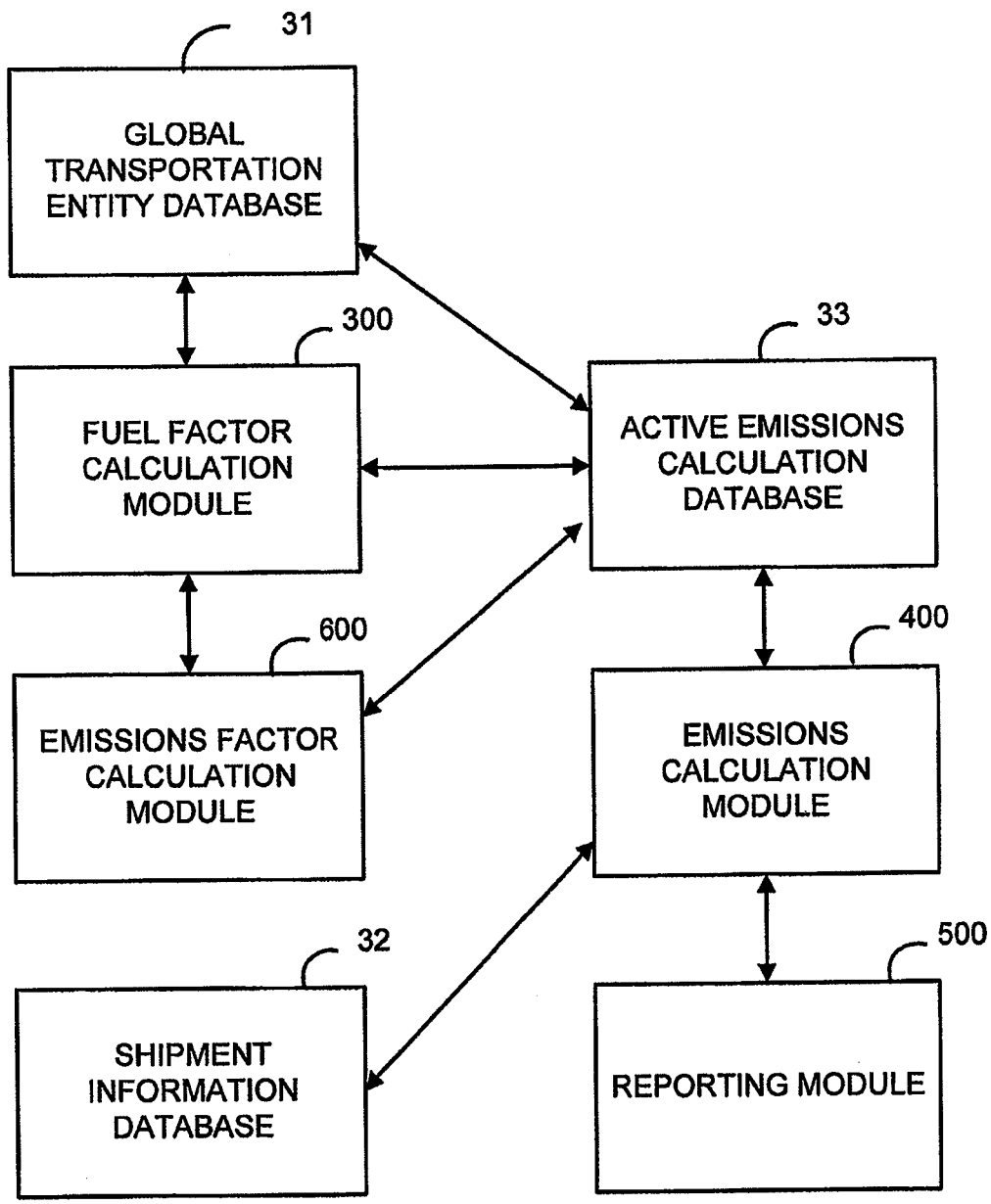

FIG. 5 is a schematic diagram illustrating the interaction of various modules and databases of the emissions calculation system shown in FIGS. 2 and 3 according to various embodiments.

Figure 6:
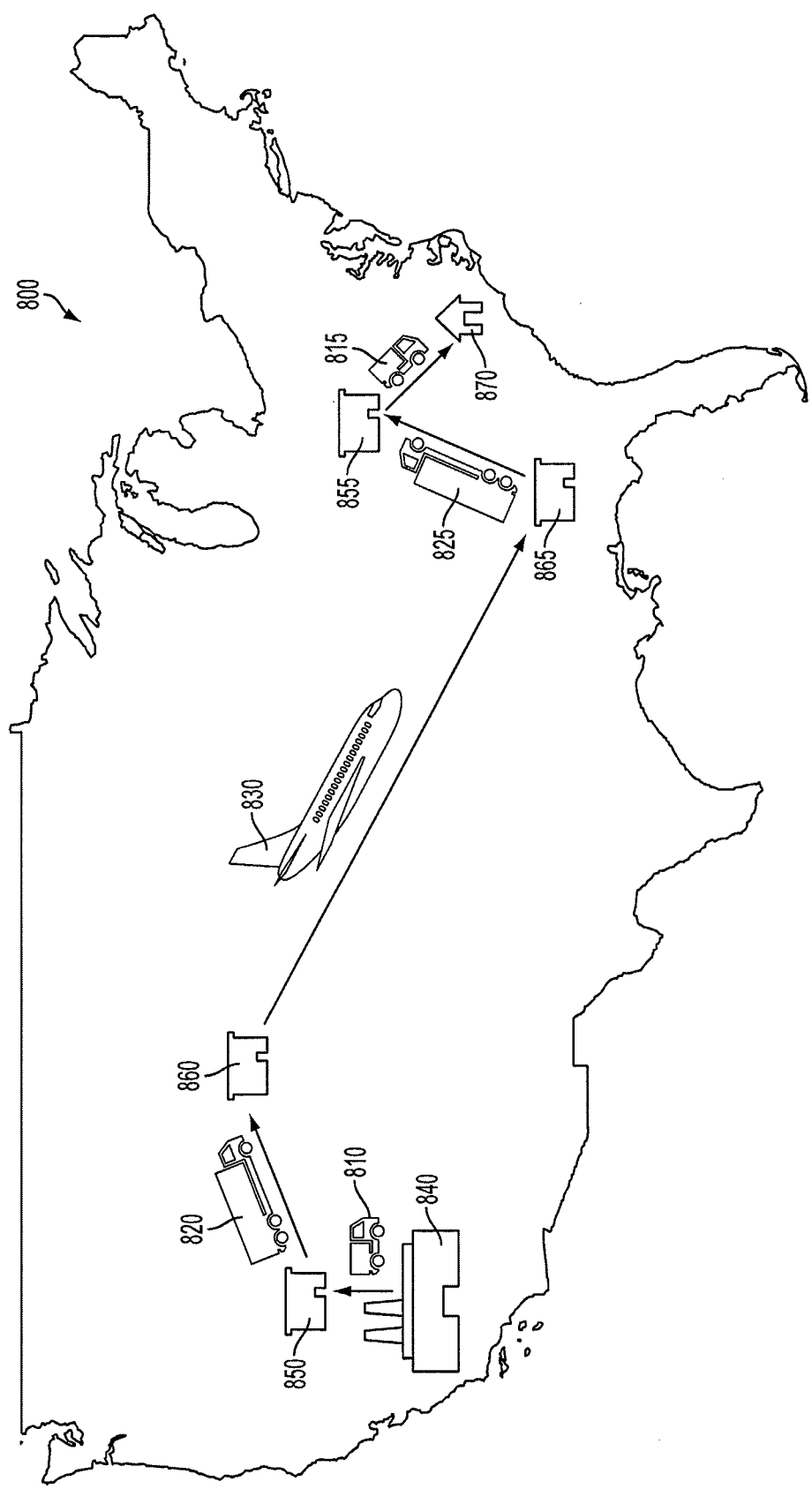

FIG. 6 is a simplified map showing a route of an exemplary shipment according to one embodiment.

Figure 7A:
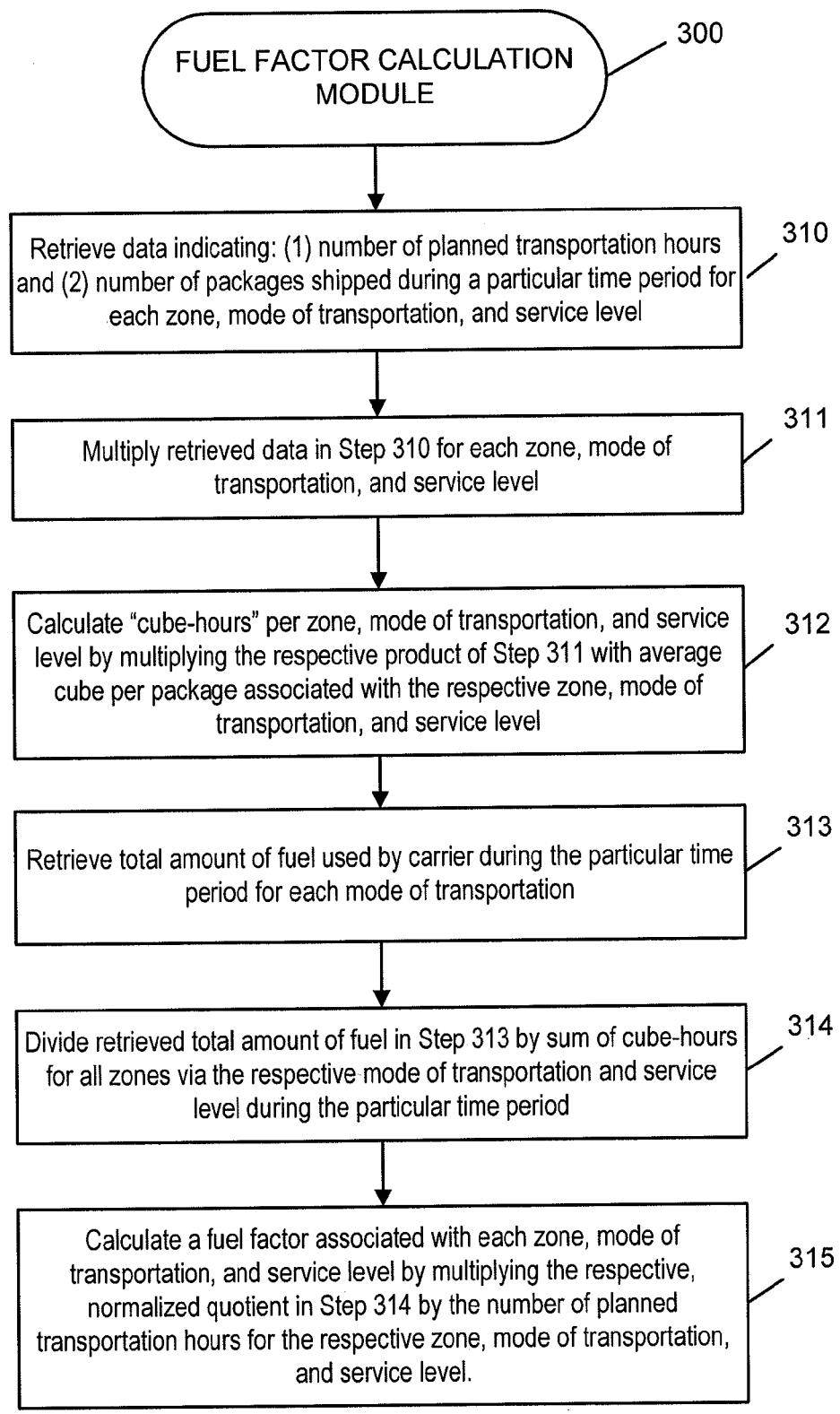

FIG. 7A is a flow diagram of steps executed by a fuel factor calculation module to calculate fuel factors for hub to hub transportation in the transportation process using a zone-based approach according to one embodiment.

FIG. 7B is a schematic diagram illustrating exemplary data tables stored in an active emissions calculation database that store data resulting from the execution of the fuel factor calculation module shown in FIG. 7A according to one embodiment.

Figure 8A:
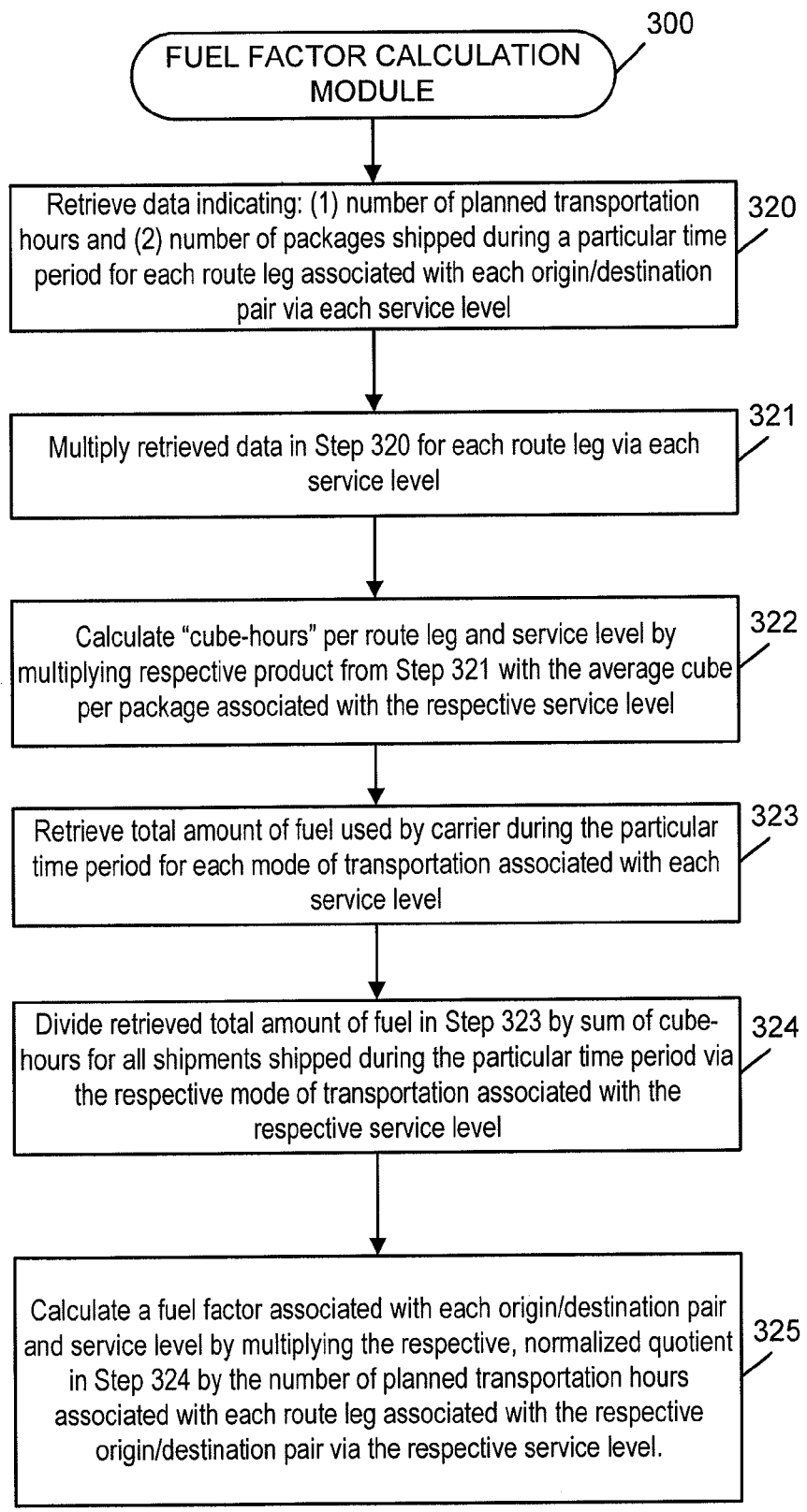

FIG. 8A is a flow diagram of steps executed by a fuel factor calculation module to calculate fuel factors for hub to hub transportation in the transportation process using a route-based approach according to one embodiment.

FIG. 8B is a schematic diagram illustrating exemplary data tables stored in the active emissions calculation database that store data resulting from the execution of the fuel factor calculation module shown in FIG. 8A according to one embodiment.

Figure 9A:
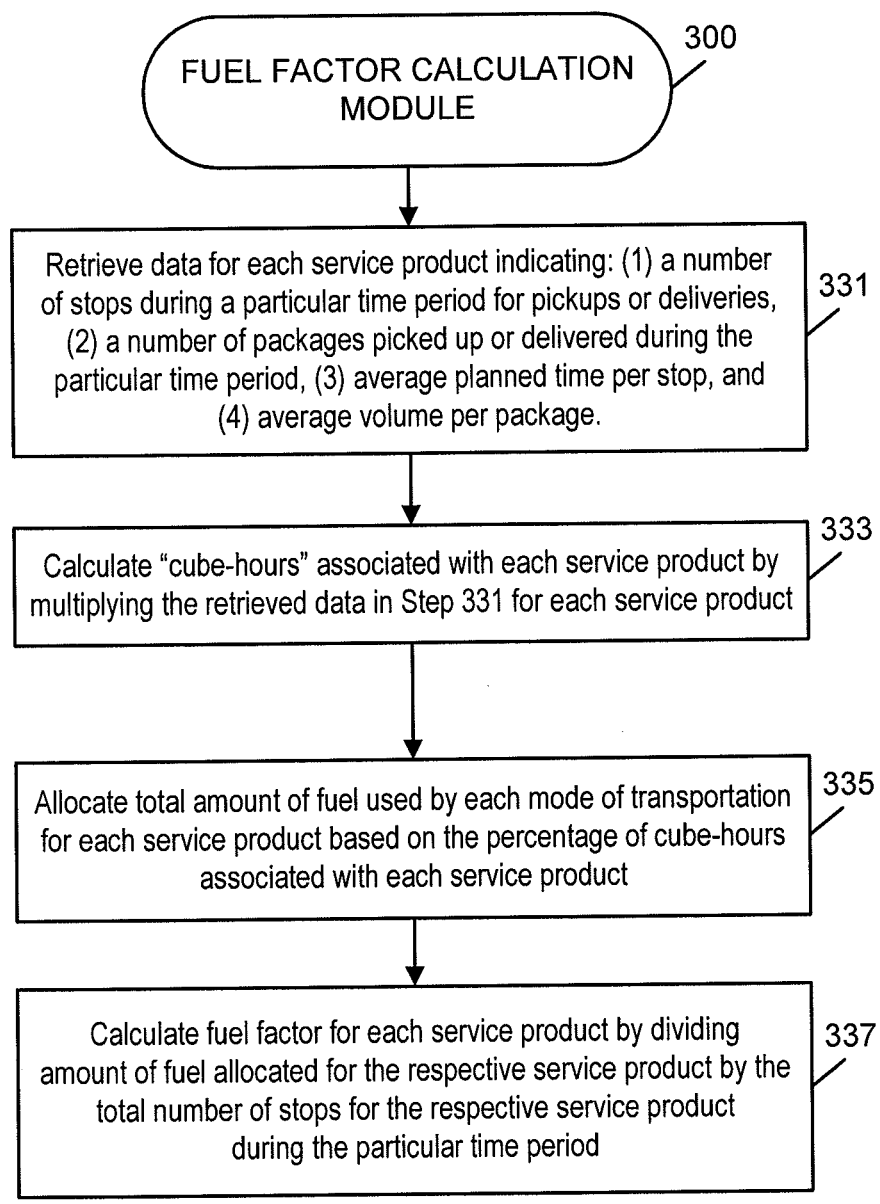

FIG. 9A is a flow diagram of steps executed by the fuel factor calculation module for calculating estimated fuel use during pickup and delivery operational activities in the transportation process according to one embodiment.

FIG. 9B is a schematic diagram illustrating exemplary data tables stored in the active emissions calculation database that store data resulting from the execution of the fuel factor calculation module shown in FIG. 9A according to one embodiment.

Figure 10:
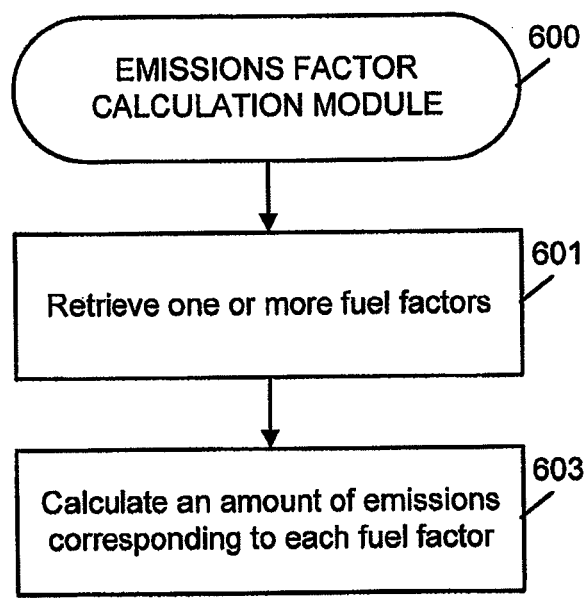

FIG. 10 is a flow diagram of steps executed by the emissions factor calculation module according to one embodiment.

Figure 11:
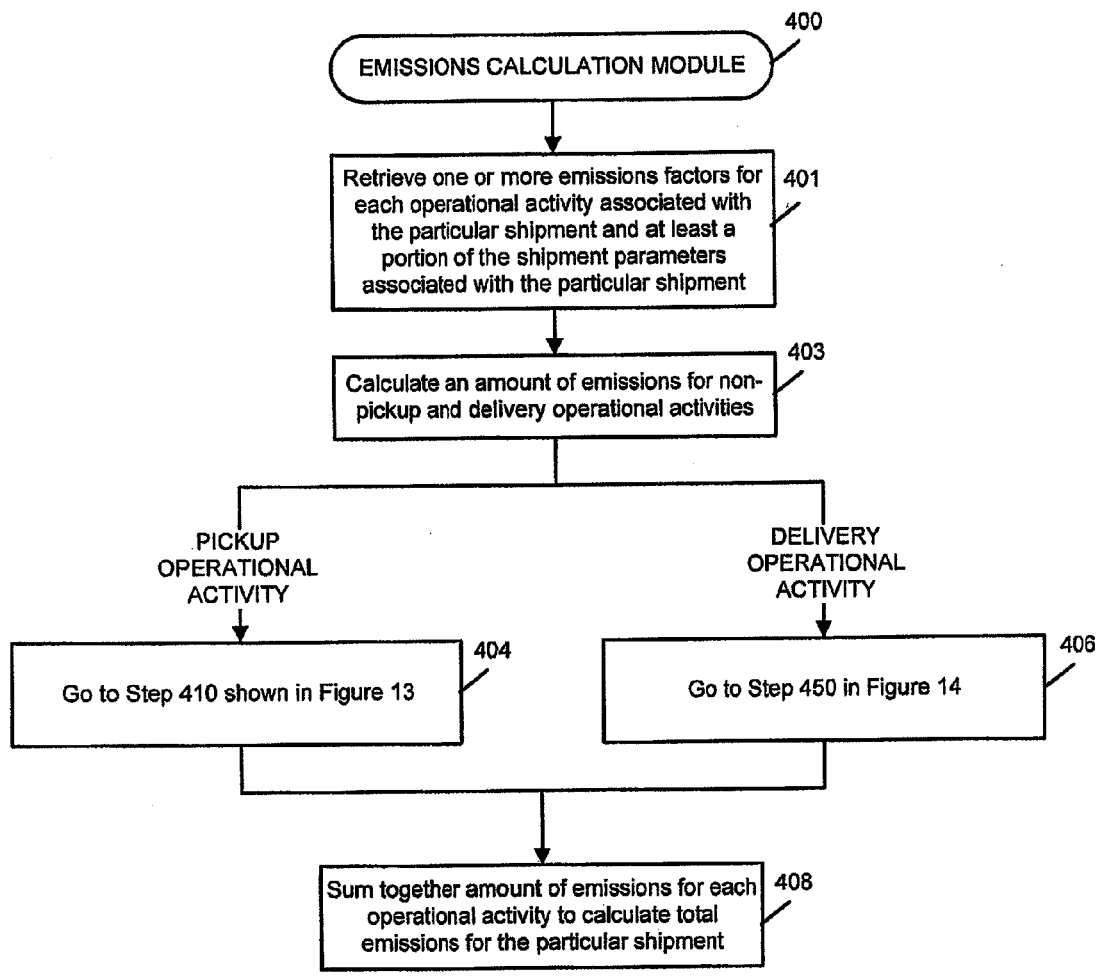

FIG. 11 is a flow diagram of steps executed by the emissions calculation module according to one embodiment.

Figure 12:
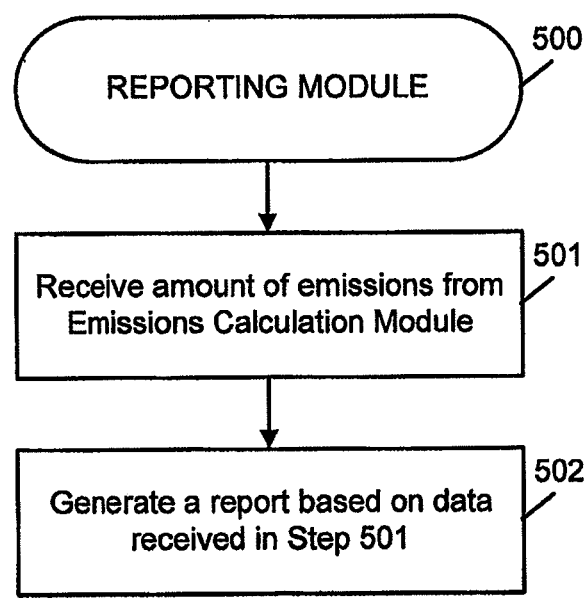

FIG. 12 is a flow diagram of the steps executed by the reporting module according to one embodiment.

Figure 13:
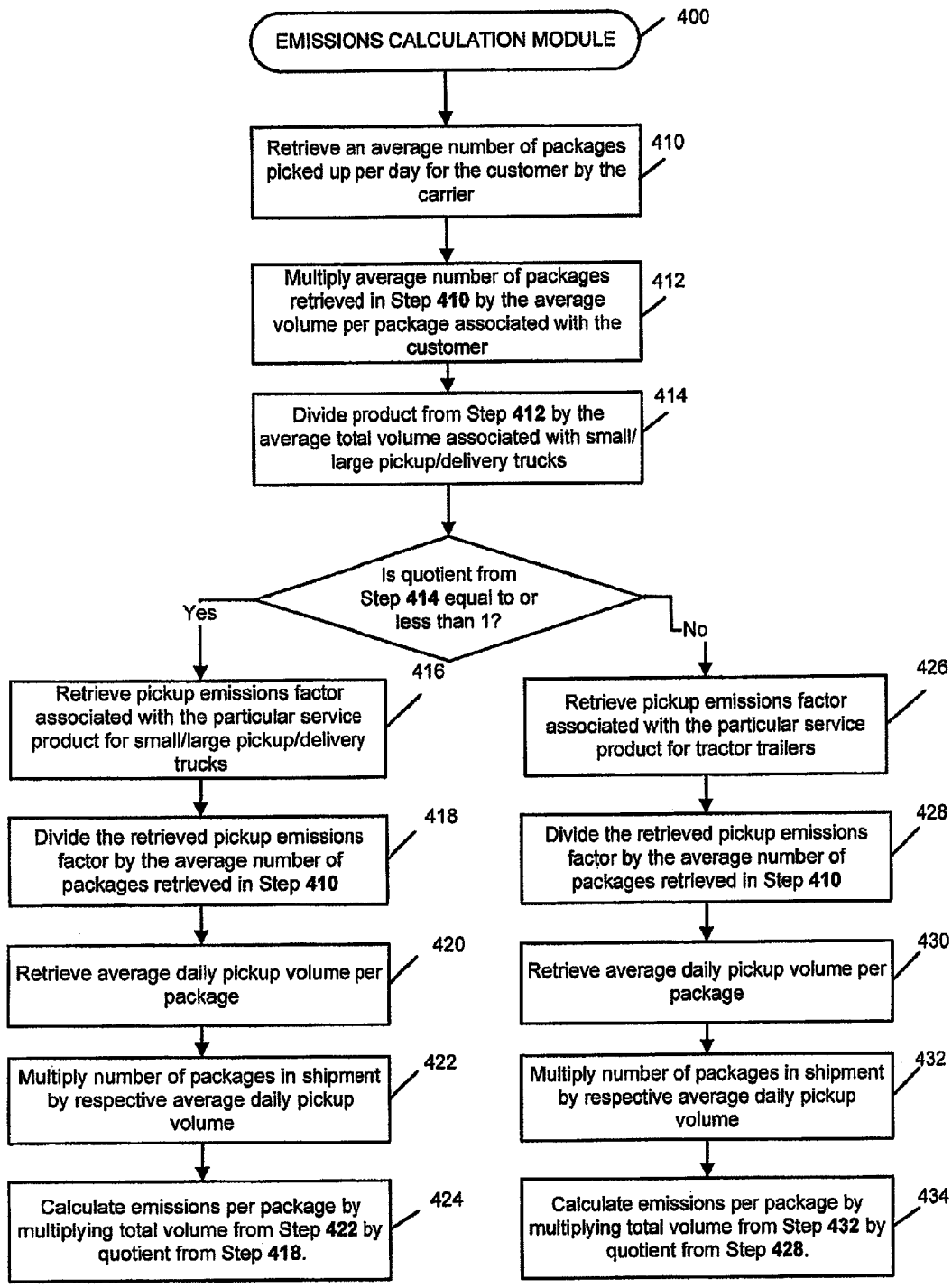

FIG. 13 is a flow diagram of steps executed by the emissions calculation module to calculate an amount of emissions resulting from a pickup operational activity according to a particular embodiment.

Figure 14:
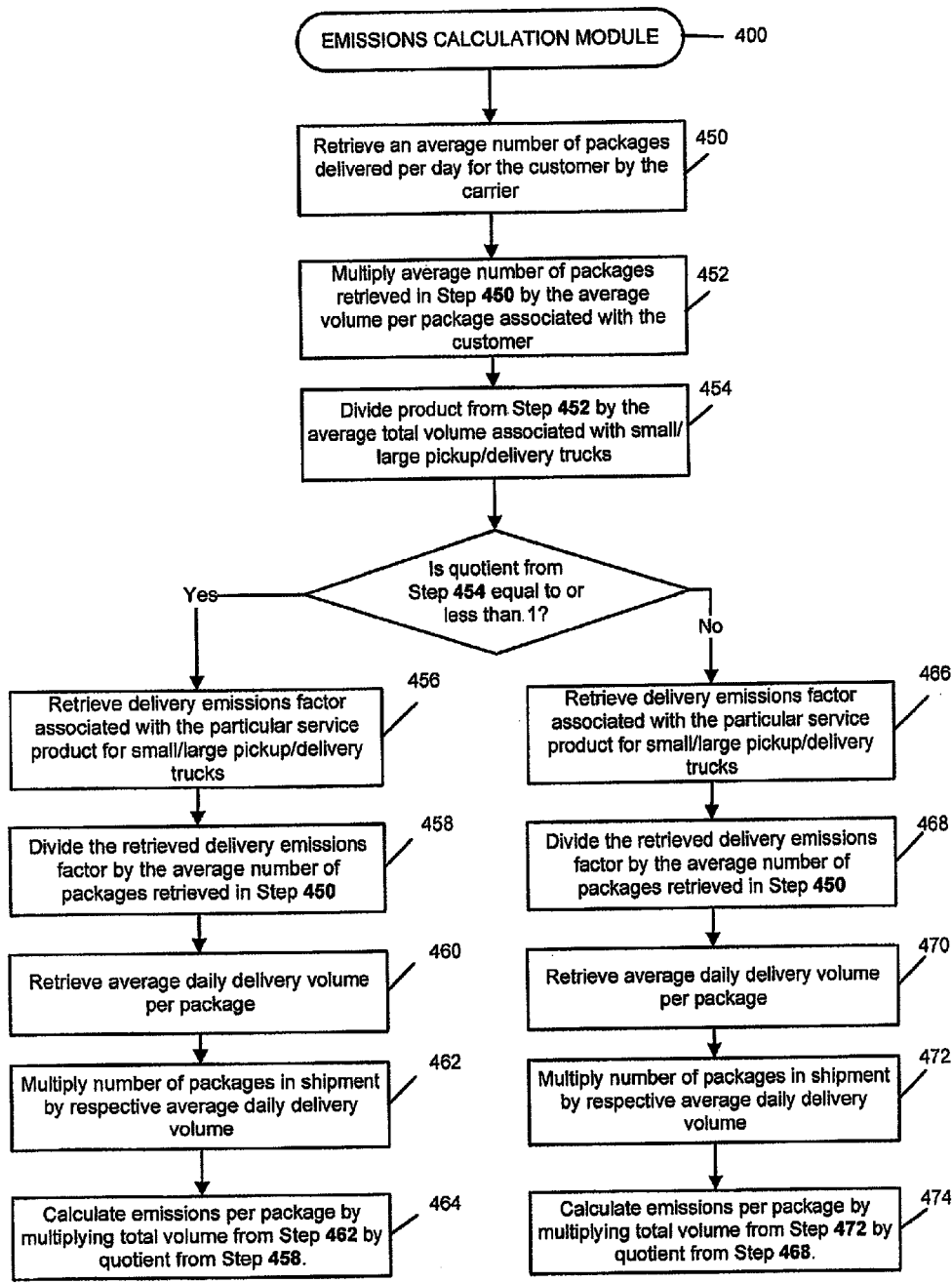

FIG. 14 is a flow diagram of steps executed by the emissions calculation module resulting from a delivery operational activity according to a particular embodiment.

DETAILED DESCRIPTION OF VARIOUS EMBODIMENTS OF THE INVENTION

Various embodiments of the present invention now will be described more fully with reference to the accompanying drawings, in which some, but not all embodiments of the invention are shown. Indeed, various embodiments of the invention may be embodied in many different forms and should not be construed as limited to the embodiments set forth herein. Like numbers refer to like elements throughout.

As will be appreciated by one skilled in the art, various embodiments of the present invention may be embodied as a method, a data processing system, or a computer program product. Accordingly, various embodiments of the present invention may take the form of an entirely hardware embodiment, an entirely software embodiment, or an embodiment combining software and hardware aspects. Furthermore, various embodiments of the present invention may take the form of a computer program product on a computer-readable storage medium having computer-readable program instructions (e.g., computer software) embodied in the storage medium. More particularly, various embodiments of the present invention may take the form of web-implemented computer software. Any suitable computer-readable storage medium may be utilized including hard disks, CD-ROMs, optical storage devices, or magnetic storage devices.

Various embodiments of the present invention are described below with reference to block diagrams and flowchart illustrations of methods, apparatuses (e.g., systems) and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks. Accordingly, blocks of the block diagrams and flowchart illustrations support combinations for performing the specified functions, combinations of steps for performing the specified functions, and program instructions for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

BRIEF SUMMARY

According to various embodiments of the present invention, an emissions calculation system calculates the emissions resulting from transporting a shipment through a transportation network from pickup to delivery. The shipment may include an individual or group of packages. In certain embodiments, the calculated emissions are based on estimated or actual amounts of fuel used in the transportation process. For example, in one embodiment, the calculated emissions are based on estimated amounts of fuel used during a particular time period based on the amount of planned transportation time expected by the carrier to transport a package within the carrier's transportation network from one point to another via a particular mode of transportation. The planned transportation time, according to one embodiment, is based on historical shipment data of the carrier.

In addition, various embodiments of the system generate and display (or otherwise make available) one or more reports of the calculated emissions information. For example, the report may provide a breakdown of the amount of fuel used and/or carbon dioxide emitted into the atmosphere resulting from various operational activities in the transportation process (e.g., pickup and delivery activities, movement of the shipment within a transportation carrier facility, and/or transportation between carrier facilities). In addition, the report may provide a total amount of fuel and/or carbon dioxide emitted from the transportation of a particular shipment or group of shipments.

FIG. 1 illustrates an exemplary flow diagram of a method 1000 of using an emissions calculation system to calculate emissions resulting from transporting a shipment according to one embodiment. In particular, the method 1000 begins at Step 1002 with a user accessing the emissions calculation system via the user's computing device and entering a request for the system to calculate an amount of emissions for a particular shipment (or group of shipments) to be transported (or that have been transported). If the request is approved by the system, the shipment parameters (e.g., number of packages in the shipment, volume of the packages, weight of packages, service level for the shipment, and/or origin/destination of the packages) are retrieved by the system in Step 1004. In one embodiment, the user may enter the shipment parameters into the system in this step. In another embodiment, the user may have entered the shipment parameters previously, and these parameters may be retrieved by the system from storage. Next, in Step 1006, the system then uses one or more of the shipment parameters to retrieve one or more emissions factors that are relevant to the amount of emissions resulting from (or estimated to result from) the shipment. The one or more emissions factors retrieved and the shipment parameters provided by the user are then used by the system to calculate (or estimate) the amount of emissions resulting from (or estimated to result from) the shipment, which is shown in Step 1012. Finally, in Step 1016, the system generates a report detailing the calculated amount of emissions resulting from (or estimated to result from) the transportation process. For example, this report may include details on the amount of carbon dioxide emitted during various operational activities in the transportation process.

In the embodiment shown in FIG. 1, the emissions calculated is carbon dioxide, but, in various other embodiments, other types of emissions may be calculated based at least in part on the amount of fuel used or estimated to be used during the transportation process. For example, the other types of emissions that may be calculated include methane ($CH_4$), nitrous oxide ($N_2O$), hydrofluorocarbons (HFCs), perfluorocarbons (PFCs), and sulfur hexafluoride ($SF_6$).

Exemplary operational activities in the transportation process and various exemplary sources of data used to calculate the amount of emissions resulting from (or estimated to result from) the transportation process are described below. Following this description, exemplary architectures for the system are described along with an exemplary operation of the system.

Exemplary Operational Activities in the Transportation Process

According to various embodiments, an exemplary shipment being transported via a carrier's transportation network is picked up from a transportation customer at an origin location, is transferred to one or more sorting and processing facilities of the carrier (referred to hereinafter as "carrier facilities"), and is ultimately delivered to the intended recipient of the shipment at a destination location. Operational activities in the transportation process include various mobile activities (e.g., transporting the shipment between the origin location and a carrier facility, transporting the shipment between carrier facilities, transporting the shipment from a carrier facility to the destination location, and transporting the shipment via a vehicle from an airplane, ship, or train to a nearby carrier facility) and stationary activities (e.g., unloading, loading, sorting, and processing the shipment at each carrier facility).

In an exemplary transportation network, the carrier may maintain one or more local carrier facilities and one or more regional carrier facilities. The local carrier facilities are typically smaller in size and more numerous than the regional carrier facilities, and the regional carrier facilities are typically located near a large airport, seaport, or other major intersection of travel (e.g., one or more interstate highways or rail lines).

In addition, the modes of transportation used during each mobile operational activity may include small delivery trucks (which are typically used for residential pickup and delivery operational activities), larger delivery trucks (which are typically used for commercial pickup and delivery operational activities), transportation trailers (which are typically used for movement of consolidated shipments between carrier facilities, but may be used occasionally to pickup and/or deliver large shipments), small aircraft (which may be used for movement of consolidated shipments between a smaller carrier facility and a larger carrier facility), large aircraft (which may be used for movement of consolidated shipments between larger carrier facilities), ships (which are typically used for movement of consolidated international shipments), and rail (which are typically used for movement of consolidated shipments between carrier facilities).

According to various embodiments, the transportation carrier identifies a planned amount of time (e.g., hours) per package expected for performing each operational activity. This planned amount of time may be based on route legs associated with the origin and destination addresses, zones, service levels, and/or service products. In certain embodiments, the identified planned amount of time is generated from industrial engineering studies and is stored by the transportation carrier on a transportation carrier server, for example.

Exemplary Sources of Data Related to Emissions

According to various embodiments, the transportation carrier stores data related to: (1) the types of fuel used by its transportation vehicles and facilities (e.g., diesel, gasoline, clean natural gas, jet fuel, etc.), (2) the amount of each type of fuel used by the carrier within a particular time period, and (3) the number of packages shipped within the carrier's transportation network over the particular time period via each service level and/or associated with each service product. In addition, the transportation carrier may store data related to an estimated amount of volume occupied by each package or an estimated weight of the package based on the service level associated with the package or type of package. The types of fuel used and the amount of each type of fuel used by the carrier may be allocated among the various operational activities. In addition, the amount of fuel may be further allocated based on the number of packages (or volume and/or weight of packages), and these allocations may be further based on the service level, service products, zones, and/or origin/destination pairs. In certain embodiments, the planned amount of time for each operational activity may also be considered when allocating fuel usage among the various operational activities. Various methods of allocating fuel among the various operational activities are described in more detail below in relation to FIGS. 7A-9A.

In certain other embodiments, the carrier may further store data related to the amount of emissions resulting from (or estimated to result from) operation of a carrier facility, amount of emissions resulting from (or estimated to result from) operation of a particular vehicle or type of vehicle, and the type(s) and actual amount(s) of fuel used for certain operational activities.

Exemplary Flow of Each Package within the Carrier's Transportation Network

In various embodiments, the carrier identifies a particular route or flow for transporting a package within the transportation network based on the origin and destination addresses associated with the package, the type of shipment, and the service level. According to various embodiments, the type of shipment may be characterized as, for example, cargo or freight (e.g., shipments of one or more pallets of packages that are bundled together for at least a portion of the transportation process) or individual package (e.g., packages to be shipped individually throughout transportation network). Types of service levels, according to various embodiments, may include, for example, next day delivery, two-day delivery, three-day delivery, ground, and/or international.

For example, for a package being shipped from an origin address in or near Atlanta, Ga. to a destination address in or near Jacksonville, Fla. via ground delivery, the identified transportation flow may include movement of the package from its origin address to a local carrier facility in Atlanta via a small delivery truck, consolidation within the Atlanta facility onto a large tractor trailer, movement of the consolidated shipment to a carrier facility in Jacksonville via the large tractor trailer, sorting of the package at the Jacksonville facility onto a small delivery truck, and movement of the package from the Jacksonville facility to the destination address via the small delivery truck.

As another example, FIG. 6 illustrates the path of an exemplary shipment 800 from a customer origin location 840 to a customer destination location 870 for a particular service level involving air shipping (e.g., next day, second day, or third day delivery) according to one embodiment. As shown, the items to be transported are transferred from the transportation customer to the transportation carrier at the customer origin location 840, and the transportation carrier transports the items to a local carrier facility 850 located near the customer origin location 840, typically via a small truck 810. The shipment is then processed at the local carrier facility 850 and transported to a larger, regional carrier facility 860, typically via a larger truck 820. The exemplary shipment 800 is then transported from the regional carrier facility 860 to another regional carrier facility 865 by airplane 830. Next, the exemplary shipment 800 is transported from the regional carrier facility 865 to a local carrier facility 855 located near the customer destination location 870, typically via another large truck 825, and from the local carrier facility 855 to the customer destination location 870, typically via another small truck 815.

In certain embodiments, the carrier may associate various route legs with a particular "origin/destination pair," wherein the "origin" refers to the location of the carrier facility to which the shipment would be routed directly from the origin address (typically a carrier facility near the origin address) and the "destination" refers to the location of the carrier facility from which the shipment would be routed directly to the destination address (typically a carrier facility near the destination address). Each origin/destination pair may be divided into route legs, and each route leg may be associated with a particular mode of transportation. The route legs associated with the origin/destination pair and the mode of transportation associated with each route leg may vary depending on the type of service and service level.

In other (or further) embodiments, a set of zones is associated with each carrier facility, and each zone indicates a relative distance (or range of distances) from the carrier facility. In one embodiment, the carrier may adopt the shipment (or postal) zones established by the United States Postal Service. For example, destinations within 200 miles of a particular carrier facility may be designated as Zone 2 relative to the carrier facility, and destinations between 200 miles and 400 miles of the carrier facility may be designated as Zone 3 relative to the carrier facility. In this example, a higher zone number indicates a larger distance from the carrier facility. However, it should be understood that in various other embodiments, a higher zone number may be indicate a smaller distance from the carrier facility, or the zone may be indicated with a letter, symbol, or combination thereof. For the exemplary shipment described above from Atlanta to Jacksonville, the carrier facility in Jacksonville may be identified as within Zone 3 of the Atlanta carrier facility, whereas a shipment from the Atlanta carrier facility to the Miami carrier facility may be identified as within Zone 4 of the Atlanta carrier facility.

According to various embodiments, mobile operational activities involving the movement of shipments between remote locations within the carrier's transportation network may include, for example, a pickup operational activity, a transport operational activity, and a delivery operational activity. In particular the pickup operational activity includes transporting the shipment from the origin address to the local carrier facility located near the origin address (or regional carrier facility if one is located near the origin), and the delivery operational activity includes transporting the shipment from the local carrier facility located near the destination address (or regional carrier facility if one is located near the destination) to the destination address. The transport operational activity includes transporting the shipment between carrier facilities (e.g., through one or more other local or regional carrier facilities in the transportation network). For example, as shown in the embodiment of FIG. 6, the pickup operational activity includes transporting the shipment from the origin 840 to the local carrier facility 850, and the delivery operational activity includes transporting the shipment from the local carrier facility 855 to the destination 870. The transport operational activity includes transporting the shipment from the local carrier facility 850 to the regional carrier facility 860, from the regional carrier facility 860 to the regional carrier facility 865, and from the regional carrier facility 865 to the local carrier facility 855.

System Architecture

An emissions calculation system 5 according to one embodiment is shown in FIG. 2. As may be understood from this figure, in this embodiment, the system 5 includes one or more user computers 10, 12, 13 that are connected, via a network 15 (e.g., a LAN or the Internet), to communicate with a transportation entity server 200. The emissions calculation system 5 is configured for retrieving data from and storing data to a database 30 that may be stored on (or, alternatively, stored remotely from) the transportation entity server 200.

FIG. 3 is a schematic diagram of the transportation entity server 200 according to various embodiments. The transportation entity server 200 includes one or more computer processors 60 that communicate with other elements within the transportation entity server 200 via a system interface or bus 61. Also included in the transportation entity server 200 are one or more display device/input devices 64 for receiving and displaying data. This display device/input device 64 may be, for example, a keyboard and/or pointing device that is used in combination with a monitor. The transportation entity server 200 further includes memory 66, which preferably includes both read only memory (ROM) 65 and random access memory (RAM) 67. The server's ROM 65 is used to store a basic input/output system 26 (BIOS), containing the basic routines that help to transfer information between elements within the transportation entity server 200.

In addition, the transportation entity server 200 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a fuel factor calculation module 300, an emissions calculation module 400, an emissions factor calculation module 600, and a reporting module 500. According to various embodiments, the fuel factor calculation module 300, the emissions calculation module 400, the emissions factor calculation module 600, and the reporting module 500 control certain aspects of the operation of the transportation entity server 200 with the assistance of the processor 60 and an operating system 80. In general, the fuel factor calculation module 300 is configured to calculate a fuel factor representing an amount of fuel used per volume (e.g., $ft^3$, $m^3$) or weight (e.g., lbs., kg) shipped (e.g., actual or estimated amount) and per stop for each service type, service level, and/or service product. According to various embodiments, the fuel factor is calculated for shipments traveling between particular origin/destination pairs and/or within particular zones of the origin (e.g., a first fuel factor is calculated for any package traveling within Zone 2 of its origin and a second fuel factor is calculated for any package traveling within Zone 3 of its origin). The emissions factor calculation module 600 is configured to calculate an amount of emissions resulting from transporting a shipment per volume or weight shipped (or per stop) based on each fuel factor calculated by the fuel factor calculation module 300. The emissions calculation module 400 calculates an amount of emissions resulting from transporting a particular shipment using one or more relevant emissions factors generated by the emissions factor calculation module 600 and at least a portion of the shipment parameters associated with the particular shipment. The reporting module 500 is configured to generate and make available to the user a report that includes the calculated emissions data. Embodiments of these modules are described in more detail below in relation to FIGS. 5, 7A, 8A, 9A, 10, 11, and 12. In a particular embodiment, these program modules 300, 400, 500, 600 are executed by the transportation entity server 200 and are configured to generate graphical user interfaces accessible to users via the Internet or other communications network. In other embodiments, the modules 300, 400, 500, 600 may be stored locally on the users' computers 10, 12, 13 and executed by one or more processors of the computers 10, 12, 13.

According to various embodiments, the modules 300, 400, 500, 600 may utilize data contained in the database 30, and the database 30 may be comprised of one or more separate, linked databases. For example, in the embodiment shown in FIG. 4, the database 30 includes a global transportation entity database 31 that contains data related to transportation statistics for past shipments processed by a transportation entity, a shipment information database 32 that contains data pertaining to the shipment parameters for one or more particular shipments, and an active emissions calculation database 33 that stores data used by and calculated by the fuel factor calculation module 300 and emissions factor calculation module 600. The contents and structure of these databases are described below in more detail.

Also located within the transportation entity server 200 is a network interface 74, for interfacing and communicating with other elements of a computer network. It will be appreciated by one of ordinary skill in the art that one or more of the transportation entity server 200 components may be located geographically remotely from other transportation entity server 200 components. Furthermore, one or more of the components may be combined, and additional components performing functions described herein may be included in the transportation entity server 200.

Exemplary System Flow

According to various embodiments of the invention, the emissions calculation system 5 calculates the carbon dioxide and/or other emissions resulting from transporting a shipment through a carrier's network. In certain embodiments, the amount of emissions calculated by the system 5 is based at least in part on an estimated or actual amount of fuel used in the transportation process. As noted above, in one embodiment, the transportation entity server 200 of the system 5 includes one or more processors 60 that are configured for executing the fuel factor calculation module 300, the emissions factor calculation module 600, the emissions calculation module 400, and the reporting module 500 to calculate and report the amount of emissions resulting from transporting a shipment through the carrier's network.

FIG. 5 illustrates the working relationship between the above-mentioned databases and modules according to various embodiments of the invention. In particular, the fuel factor calculation module 300 retrieves data from the global transportation entity database 31, the shipment information database 32, and the active emissions calculation database 33 to calculate one or more fuel factors. The fuel factor calculation module 300 then transmits the calculated fuel factors to the emissions factor calculation module 600 according to one embodiment. In other embodiments, these fuel factors are retrieved by the emissions factor calculation module 600. The emissions factor calculation module 600 then calculates an emissions factor corresponding to each fuel factor. The emissions calculation module 400 retrieves (or receives) shipment parameters from the shipment information database 32 about the particular shipment for which the emissions are being calculated and retrieves (or receives) one or more emissions factors that relate to at least a portion of the shipment parameters for the particular shipment (e.g., the emissions factors corresponding to each operational activity encountered by the particular shipment based on the shipment's service level and origin and destination addresses). The emissions calculation module 400 uses these one or more emissions factors to calculate an estimated or actual amount of emissions resulting from the transportation of the shipment through the transportation network. The data calculated by the emissions calculation module 400 is retrieved by (or transmitted to) the reporting module 500. Embodiments of each of these databases and modules are discussed in more detail below.

Global Transportation Entity Database

According to various embodiments, the global transportation entity database 31 generally contains data pertaining to shipments previously transported by the carrier and acts a repository for shipment-related data recorded by the carrier. Exemplary data contained in the global transportation entity database 31 includes, but is not limited to: (1) logistical planning data (e.g., specific routes of shipment for each origin/destination pair, zones (or a distance range) associated with each carrier facility, sort schedules for each carrier facility (e.g., twilight, day, evening), pickup and delivery locations for residential and commercial shipments, the location of local and regional carrier facilities, modes of transportation associated with movement of packages between facilities based on service level and sort schedules, and the type of fuel used by each transportation vehicle); (2) statistical shipment data (e.g., mileage and/or estimated travel time between each origin/destination pair and/or route legs associated therewith, an amount of time estimated for performing each operational activity during the transportation process (e.g., based on industrial engineering studies), a number of stops for pickup and delivery on each pickup and delivery route, an estimated amount of time per stop (e.g., based on industrial engineering studies), an estimated amount of volume (e.g., $ft^3$, $m^3$) occupied by a package having a particular weight (e.g., pounds, kilograms) or being within a particular range of weights (e.g., based on industrial engineering studies), an estimated amount of weight (e.g., lbs., kg) for a package being transported via a particular mode of transportation and/or via a particular service level (e.g., based on industrial engineering studies), and an estimated amount of volume (e.g., $ft^3$, $m^3$) for a package being transported via a particular mode of transportation and/or via a particular service level (e.g., based on industrial engineering studies); and (3) other shipment data that may be tracked and stored by the carrier. For example, in one embodiment, logistical planning data may have been created by the carrier to evaluate and run its transportation operations, and this data is stored on the global transportation entity database 31 for future use. Similarly, statistical shipment data may have been calculated and/or recorded during the planning and execution of past shipments and stored on the global transportation entity database 31. In addition, as noted above, according to various embodiments, at least a portion of the data may be arranged according to the various zones through which (and/or routes along which) shipments travel and by operational activities within the transportation process (e.g., pickup, delivery, transport, and sorting and/or processing). At least a portion of the data may be further arranged according to service type, service level, and/or service product associated with each shipment and/or the type of vehicle used for each operational activities.

Shipment Information Database

According to various embodiments, the shipment information database 32 contains data pertaining to the particular shipment(s) for which the amount of emissions is to be calculated. The data generally includes shipping parameters associated with the particular shipment that may affect, directly or indirectly, the amount of emissions resulting from transporting the shipment from the origin address to the destination address. For example, the data may include, but is not limited to: (1) the origin address and destination address of the particular shipment, (2) the service type, (3) the service level, (4) the service product, (5) the volume and/or weight of the particular shipment (and/or the volume and/or weight of each of the one or more packages in the shipment), (6) number of packages in the shipment, and (7) one or more tracking numbers associated with the shipment and/or the one or more packages included in the shipment. In addition, according to various embodiments, data may also include the business unit of the carrier (if the carrier has multiple business units), a pickup type, and average daily pickup (if available).

According to various embodiments, this data may be provided by the customer to the carrier via a data file (e.g., CVS) or otherwise, or this data may be previously stored and extracted from the carrier's system upon request.

Active Emissions Calculation Database

According to various embodiments, the active emissions calculation database 33 stores data that is used by the fuel factor calculation module 300 to calculate various fuel factors. For example, data contained in the active emissions calculation database may include, but is not limited to: (1) data retrieved by the fuel factor calculation module 300 from the global transportation entity database 31 that is relevant to the amount of fuel used for certain types of shipments and certain operational activities; (2) volume and/or weight of past shipments; (3) allocation of fuel used during the shipment for various operational activities; (4) typical numbers of stops for pickups and deliveries; (5) transit times for pickups and deliveries; (6) calculated fuel factors; and/or (7) calculated emissions factors. In addition, according to various embodiments, the data in the active emissions calculation database 33 may be organized or related by: (1) zones, (2) mode of transportation, (3) origin-destination pairs, (4) route legs, (5) service types, (6) service level, (7) service product, and/or (8) operational activity.

In various other embodiments, the data described above as being stored on each database 31, 32, and 33 may be stored on one or more databases or in one or more storage areas.

Fuel Factor Calculation Module

According to various embodiments, the fuel factor calculation module 300 is configured to calculate at least one fuel factor that is associated with at least one operational activity, which, depending on the operational activity associated with the fuel factor, may be expressed as an amount of fuel used per volume shipped or per weight shipped (e.g., for transportation between carrier facilities or movement through a carrier facility) or an amount of fuel per stop (e.g., for pickup and delivery operational activities), for example. For example, in certain embodiments, the amount of fuel may be expressed as gallons or liters, and the volume may be expressed as a "cube," which represents a generic unit of volume (e.g., ft$^3$, m$^3$). In other embodiments, the amount of fuel may be expressed as gallons or liters, and the weight may be expressed as an amount of pounds or kilograms, for example.

In various embodiments, the fuel factor calculation module 300 calculates a fuel factor for each operational activity in the transportation process. In certain embodiments, the fuel factor calculation module 300 calculates a fuel factor for each operational activity based on each service level and on each origin/destination pair, zone, and/or relative distances traveled by shipments. Because each operational activity may utilize a different type and/or amount of fuel, calculating separate fuel factors for each activity results in a more accurate calculation of the total amount of fuel used (or estimated to be used) for shipping the particular shipment, according to various embodiments. In other embodiments, each fuel factor calculated may be associated with two or more operational activities.

For example, according to various embodiments, the fuel factor calculation module 300 calculates one or more fuel factors associated with a transport operational activity using a zone-based approach and/or a route-based approach. In general, the zone-based approach includes allocating fuel consumption based on the number of packages (or planned hours for transporting packages) shipped via each service level, zone, and mode of transportation and calculating a fuel factor indicating an amount of fuel used per package cube (or weight) for each service level, zone, and mode of transportation based on the amount of fuel allocated.

The route-based approach includes allocating fuel consumption based on the number of packages (or planned hours for transporting packages) shipped via each service level between the origin/destination pair and calculating fuel factors that each indicate the amount of fuel used to transport each package cube (or weight) between each origin/destination pair via each service level.

As discussed below in more detail, FIG. 7A illustrates the steps executed by the fuel factor calculation module 300 to calculate fuel factors using the zone-based approach for the transport operational activity according to various embodiments. FIG. 8A illustrates the steps executed by the fuel factor calculation module 300 to calculate fuel factors using the route-based approach for the transport operational activity according to various embodiments. FIG. 9A illustrates the steps executed by the fuel factor calculation module 300 to calculate fuel factors for the pickup and delivery operational activities according to various embodiments. As shown in FIGS. 7A, 8A, and 9A and described below, the fuel factor calculation module 300 is configured for calculating fuel factors for the transport operational activity using either (or both) the zone-based approach or the route-based approach and is configured for calculating fuel factors for the pickup and delivery operational activities. However, in other various embodiments (not shown), one or more of these calculations may be performed by one or more separate modules.

Calculating Fuel Factors for the Transport Operational Activity using Zone-Based Approach FIG. 7A illustrates the steps executed by the fuel factor calculation module 300 to calculate fuel factors using the zone-based approach for the transport operational activity according to one embodiment of the invention. The exemplary steps shown in FIG. 7A are performed to calculate a fuel factor associated with each zone (e.g., Zone 2, Zone 3, etc.) and mode of transportation (e.g., large airplane, small airplane, tractor trailer, large truck, rail, boat) for each service level (e.g., next day delivery, second day delivery, third day delivery, ground, international, freight).

The module 300 begins at Step 310 by retrieving data indicating (1) a number of planned transportation time (e.g., minutes, hours) associated with transporting a package between two carrier facilities for each zone and mode of transportation associated with each service level and (2) a total number of packages shipped within each zone via each mode of transportation associated with each service level during a particular time period. For example, the data retrieved by the module 300 may indicate that two hours are expected for transporting a package within Zone 3 of a regional facility via airplane via next day delivery service, and 34 million packages were transported via airplane within Zone 3 of a carrier facility via next day delivery service in 2007.

Next, in Step 311, for each zone, mode of transportation, and service level, the fuel factor calculation module 300 multiples the retrieved number of planned transportation time for each package by the retrieved total number of packages shipped associated with the respective zone, mode of transportation, and service level. Using the example introduced above, the product of Step 311 is 68 million hours*packages. Next, in Step 312, this product is multiplied by the average volume (or "cube") per package shipped via each mode of transportation and service level to determine the total number of "cube-hours" associated with each zone, mode of transportation, and service level. Building on the example above, if the average volume per package being shipped via airplane and next day delivery is 0.5 cubic feet per package, the product of Step 312 is 34 million cubic feet-hours, which is the number of cube-hours for all of the packages transported via airplane via next day delivery within Zone 3 of a carrier facility in 2007. Alternatively, in other embodiments (not shown), the number of cube-hours associated with each zone, mode of transportation, and service level may be calculated and stored previously by the carrier, and instead of executing Steps 310 and 311, the module 300 may retrieve this pre-calculated data. In addition, in other various embodiments, the average volume per package may be the same for all packages, regardless of mode of transportation or service level, or may be based on service level, mode of transportation, zone, and/or origin/destination pair.

In Step 313, a total amount of fuel used by the carrier during the particular time period for each mode of transportation is retrieved. According to various embodiments, the total amount of fuel used by the carrier during the particular time period for each (or a particular type of) mode of transportation may be tracked and stored by the carrier for one or more operational activities and/or service levels, or the total amount of fuel used by the carrier for each (or a particular type of) mode of transportation and one or more operational activities and/or service levels may be estimated (allocated) from a total amount of fuel used for the respective mode of transportation for all operational activities and service levels.

For example, in a particular embodiment (not shown), the total amount of jet fuel used by the carrier is allocated based on flight classification and service level. Flight classifications may include, for example, international (packages to be transported between a U.S. airport and an international airport or between two international airports), cargo (packages that are typically bundled together (e.g., on one or more pallets) and shipped by the same customer, and the packages are being transported between two U.S. airports), and domestic (individually shipped packages to be transported between two U.S. airports). The carrier may designate a particular plane to carry packages associated with a certain flight classification, but the carrier may also include packages having different flight classifications on the same plane. In addition, in one embodiment, the carrier assigns any empty positions on the plane to the flight designation assigned to the plane. To allocate the amount of jet fuel used for each flight classification, the fuel factor calculation module retrieves the number of positions associated with (or assigned to) each flight classification during the particular time period and calculates the percentage of positions associated with each flight classification. The percentage associated with each flight classification is then multiplied by the total amount of jet fuel to determine the total amount of jet fuel associated with each flight classification. Next, the fuel factor calculation module retrieves the number of positions occupied on the planes (or assigned) by packages associated with each service level associated with each flight classification and calculates the percentage of positions associated with each service level. The percentage of positions associated with each service level is then multiplied by the total amount of jet fuel associated with the respective flight classification to determine the total amount of jet fuel associated with each service level. Thus, when the mode of transportation is a jet, the total amount of fuel retrieved in Step 313 is the total amount of jet fuel associated with each service level, according to certain embodiments.

In certain embodiments, the amount of fuel used by tractor trailers, which are typically used for moving shipments between carrier facilities, is associated with the transport operational activities. However, in some embodiments, tractor trailers may be used to pickup or deliver shipments en route between carrier facilities during a transport operational activity. Thus, in certain embodiments, the module 300 allocates a portion of the fuel used by the tractor trailers that would otherwise be included in the total amount of fuel used for ground vehicles associated with transport operational activities to the amount of fuel used by ground vehicles for pickup/delivery operational activities. In particular, according to one embodiment (not shown), the module 300 identifies the percentage of cube-hours (or weight-hours) attributable to shipments that are picked up or delivered by tractor trailers en route between carrier facilities, subtracts an amount of fuel equal to this percentage from the amount of fuel indicated as used for transport operational activities, and adds the amount of fuel to the amount of fuel indicated as used for pickup/delivery operational activities.

In Step 314, the total amount of fuel for each mode of transportation and service level is divided by the sum of the total amount of cube-hours for the packages transported in all zones via the respective mode of transportation and service level within the particular time period. These quotients are then normalized to one cubic-foot by dividing each quotient by the average cube per package (e.g., 0.5 cubic feet/package) for the respective service level.

Next, in Step 315, the module 300 calculates a fuel factor associated with each zone, mode of transportation, and service level by multiplying the number of gallons of fuel used per cube-hour for shipments within the respective zone via the respective mode of transportation and the respective service level by the number of planned transportation time associated with transporting a shipment within the respective zone via the respective mode of transportation and respective service level. The fuel factors associated with each zone, mode of transportation, and service level are stored by the transportation entity server 200 (e.g., in the active emissions calculation database 33).

Although not shown in FIG. 7A, the fuel factor calculation module 300, according to certain embodiments, may send the data it retrieves and/or calculates to the active emissions calculation database 33 after each step described above or after selected steps. For example, FIG. 7B illustrates three tables—Table A, Table B, and Table C—that store data calculated by the fuel factor calculation module 300. Each table stores data related to transportation of shipments between two carrier facilities via a particular service level. For example, Table A stores the cube-hours calculated in Step 312 that are associated with a particular service level for shipments that were transported in the particular time period within each zone and via each mode of transportation. Table B stores the number of gallons allocated in Step 313 as being used to transport shipments during the particular time period between two carrier facilities within each zone via each mode of transportation and service level. Table C stores the fuel factors calculated in Step 315 associated with each zone, mode of transportation, and service level.

In other embodiments, instead of zones, fuel factor calculations for transport operational activities may be based on an estimated or actual distance (or range of distances) between the origin and destination and/or the carrier facilities through which shipments may be transported. In addition, in other embodiments, instead of the fuel factors being based on the volume of the packages, the fuel factors may be based on the weight of the packages (e.g., gallons (or liters) per pound (or kilogram)).

Calculating Fuel Factors for the Transport Operational Activity using Route-Based Approach FIG. 8A illustrates the steps executed by the fuel factor calculation module 300 to calculate fuel factors using the route-based approach for the transport operational activity according to one embodiment of the invention. The exemplary steps shown in FIG. 8A are performed to calculate a fuel factor associated with each origin/destination pair for each service level (e.g., next day delivery, second day delivery, third day delivery, ground, international, freight).

As noted above, in each origin/destination pair, the "origin" is the location of the first carrier facility that receives the shipment from the transportation customer's origin location, and the "destination" is the location of the last carrier facility that processes the shipment before the shipment reaches its destination location. Furthermore, each origin-destination pair may be divided into one or more route legs, and each route leg may be, for example, associated with travel by a particular vehicle (mode of transportation). In various embodiments, the route legs (and/or modes of transportation associated with them) may vary based on service level.

To calculate fuel factors for each origin/destination pair, the module 300 begins at Step 320 by retrieving data indicating (1) a number of planned transportation time (e.g., minutes, hours) associated with transporting a package along each route leg associated with each origin/destination pair via each service level and (2) a total number of packages shipped along each route leg via each service level during a particular time period.

Next, in Step 321, for each route leg and service level, the fuel factor calculation module 300 multiples the retrieved number of planned transportation time for each package by the retrieved total number of packages shipped associated with the respective route leg and service level. Next, in Step 322, this product is multiplied by the average volume (or "cube") per package shipped via each service level to determine the number of cube-hours associated with each route leg of each origin/destination pair for each service level. Alternatively, in other embodiments (not shown), the number of cube-hours associated with each route leg and service level may be calculated and stored previously by the carrier, and instead of executing Steps 321 and 322, the module 300 may retrieve this pre-calculated data. In addition, in other various embodiments, the average volume per package may be the same for all packages or may be based on service level, mode of transportation, zone, and/or origin/destination pair.

In Step 323, a total amount of fuel used by the carrier during the particular time period for each mode of transportation associated with each service level is retrieved, and in Step 324, the total amount of fuel for each mode of transportation associated with each service level is divided by the sum of the total amount of cube-hours for the packages transported via the respective mode of transportation associated with each service level for all origin-destination pairs within the particular time period. These quotients are then normalized to one cubic-foot by dividing the quotients by the average cube per package associated with the respective service level and mode of transportation.

Next, in Step 325, the module 300 calculates a fuel factor associated with each origin/destination pair and each service level. In one embodiment, the module 300 multiplies the respective number of gallons of fuel used per cube-hour associated with the respective mode of transportation and service level by the number of planned transportation time associated with transporting a shipment along each route leg of the respective origin/destination pair via the respective service level. These products are then summed together to calculate the fuel factor associated with the respective origin/destination pair and service level and are stored by the transportation entity server 200 (e.g., in the active emissions calculation database 33).

Although not shown in FIG. 8A, the fuel factor calculation module 300, according to certain embodiments, may send the data it retrieves and/or calculates to the active emissions calculation database 33 after each step described above or after selected steps. For example, FIG. 8B illustrates three tables—Table D, Table E, and Table F—that store data calculated by the fuel factor calculation module 300. In particular, Table D stores the cube-hours calculated in Step 322 that are associated with a particular service level and each route leg associated with each origin/destination pair. Table E stores the number of gallons allocated in Step 323 as being used to transport shipments during the particular time period between each origin/destination pair via each service level. Table F stores the fuel factors calculated in Step 325 associated with each origin/destination pair for each service level.

In other embodiments, instead of the fuel factors being based on the volume of the packages, the fuel factors may be based on the weight of the packages (e.g., gallons (or liters) per pound (or kilogram)).

In addition, in other various embodiments (not shown), the fuel calculation module 300 may be configured to execute steps 310 through 314, and then calculate a fuel factor associated with each origin/destination pair and service level by multiplying the normalized quotient from in Step 314 by the number of planned transportation hours associated with each route leg associated with the respective origin/destination pair via the respective service level. These products are then summed together to calculate the fuel factor associated with the respective origin/destination pair and service level.

Calculating Fuel Factors for Pickup and Delivery Operational Activities

As shown in FIG. 6, the pickup and delivery operational activities occur at the beginning and end of each shipment, respectively. The pickup operational activity includes transporting a shipment from an origin address (e.g., origin 840) to the first carrier facility that processes the shipment, which is typically located near the origin address (e.g., local carrier facility 850) and is referred to hereinafter as an "origin facility." The delivery operational activity includes transporting the shipment from the last carrier facility that processes the shipment, which is typically located near the destination address (e.g., local carrier facility 855) and is referred to hereinafter as a "destination facility," to the destination address (e.g., destination 870). According to various embodiments, for residential services, pickup and delivery operational activities are typically performed using small trucks that travel between various shipment origins, destinations, and the origin and destination carrier facilities (e.g., carrier facilities 850, 855), and for commercial services, these operational activities are typically performed by larger trucks. In addition, each truck may travel to multiple addresses to pickup or deliver a plurality of shipments before returning to the origin or destination carrier facility, which requires the trucks to stop and start along the pickup and delivery routes. As a result, according to various embodiments, it is difficult to calculate fuel factors associated with the pickup and delivery operational activities using the zone-based or route-based approaches described above.

Thus, in various embodiments, the fuel factor calculation module 300 bases its fuel factor calculations for pickup and delivery operational activities on: (1) the number of stops made for pickup and delivery operational activities, respectively, (2) total planned time for pickup and delivery operational activities, respectively, based on an estimated amount of time per stop and the number of stops made, and (3) the amount of fuel used for pickup and delivery operational activities based on the total planned time for pickup and delivery operational activities. In certain embodiments, at least a portion of this data related to pickup operational activities is organized by service product and pickup type, and at least a portion of the data related to delivery operational activities is organized by service product. Service products generally indicate whether the shipment is being shipped by a commercial or residential customer, the service level, and the type of package being transported (e.g., commercial/residential ground letter, commercial/residential ground package, commercial/residential ground package, commercial/residential next day air letter, commercial/residential next day air package, freight, etc.), and pickup type generally indicates the frequency with which customers utilize the carrier's pickup transportation services (e.g., daily pickup, occasional pickup, occasional air pickup, temporary air pickup, one time pickup). In other embodiments, this data may be organized by service level, which includes one or more service products.

FIG. 9A shows exemplary steps executed by the fuel factor calculation module 300 to calculate fuel factors for the pickup and delivery operational activities according to one embodiment. For each of the pickup and delivery operational activities, as shown in Step 331, the fuel factor calculation module 300 retrieves data related to: (1) the number of stops made during a particular time period for pickups or deliveries associated with each service product, (2) the number of packages associated with each service product that were picked up or delivered by the carrier during the particular time period, (3) the average planned time per stop (e.g., planned hours) for pickup or delivery associated with each service product, and (4) the average volume per package associated with each service product. The average planned time per stop and/or the average volume per package may be derived from industrial engineering studies conducted by the carrier or a third party entity, according to various embodiments. In addition, in certain embodiments, for pickup operational activities, the data retrieved in Step 331 may be further organized based on the pickup type associated with each package.

In certain embodiments, the number of stops made during the particular time period associated with each service product is the total number of "equivalent stops" associated with the respective service product. For example, if the carrier delivers three packages at one stop, and of the three packages, the first package is associated with a first service product, a second package is associated with a second service product, and a third package is associated with a third service product, the carrier assigns 0.33 equivalent stops to each package. The number of equivalent stops for picking up or delivering each package associated with each service product during the particular time period are summed together to provide a total number of equivalent stops associated with each service product during the particular time period.

For the purposes of illustration, an example of the pickup data that may be retrieved in Step 331 is provided as follows: the number of stops made during 2007 for pickups associated with commercial customers having daily pickups and shipping next day air letter packages may be 7.4 million stops, the number of next day air letter packages picked up from these commercial customers in 2007 may be 43 million packages, the planned time per stop for picking up next day air letter packages from these commercial customers may be 0.05 hours, and the average volume per next day air letter package picked up from these commercial customers may be 0.6 ft$^3$/package. Similarly, for the purposes of illustration, an example of the delivery data that may be retrieved in Step 331 is provided as follows: the number of stops made during 2007 for deliveries of next day air letter packages from commercial customers may be 23.3 million stops, the number of next day air letter packages from commercial customers delivered in 2007 may be 56.5 million packages, the planned time per stop for delivering next day air letter packages from commercial customers may be 0.04 hours, and the average volume per next day air letter package delivered from commercial customers may be 0.6 ft$^3$/package.

Next, in Step 333, for each of the pickup and delivery operational activities, the fuel factor calculation module 300 calculates the total "cube-hours" associated with each service product by multiplying the data retrieved in Step 331. Thus, given the exemplary data noted above, the module 300 calculates in Step 333 that the number of cube-hours associated with picking up next day air letter packages from commercial customers having daily pickups during 2007 is 9.546 trillion hours*ft$^3$, and the number of cube-hours associated with delivering next day air letter packages from commercial customers during 2007 is 31.6 trillion hours*ft$^3$.

In Step 335, for each of the pickup and delivery operational activities, the fuel factor calculation module 300 allocates the total amount of fuel used by each mode of transportation for pickup and delivery operational activities for each service product. The allocation is based on the percentage of cube-hours associated with each service product, and this allocated amount is then normalized based on the average volume per package. In particular, in one embodiment, the number of cube-hours associated with each service product and respective mode of transportation is divided by the total amount of cube-hours for all service products associated with each pickup or delivery operational activity and mode of transportation, and this quotient is multiplied by the total amount of fuel used by each mode of transportation during the particular time period for pickup and delivery activities. According to certain embodiments, this allocation step may be repeated for each type of fuel (e.g., diesel, gasoline, clean natural gas) used in pickup and delivery activities to estimate the amount of each type of fuel used for picking up or delivering shipments associated with each service product.

In other embodiments, the calculations performed in Steps 331 through 335 may be calculated using the average weight of the packages (e.g., gallons (or liters) per pound (or kilogram)) associated with each service product.

In Step 337, the fuel factor calculation module 300 then calculates a fuel factor for each service product by dividing the normalized amount of fuel allocated for the respective service product in Step 333 by the total number of stops for the respective service product retrieved in Step 331. These fuel factors are then stored by the transportation entity server 200 (e.g., in the active emissions calculation database 33).

Although not shown in FIG. 9A, the fuel factor calculation module 300, according to certain embodiments, may send the data it retrieves and/or calculates to the active emissions calculation database 33 after each step described above or after selected steps. For example, FIG. 9B illustrates four tables—Table G, Table H, Table I, and Table J—that store data calculated by the fuel factor calculation module 300. In particular, Table G stores the number of stops retrieved in Step 331 for each service product for each of the pickup and delivery operational activities. Table H stores the total amount of calculated planned time for pickup and delivery operational activities associated with each service product. Table I stores the total amount of fuel allocated for each service product for pickup and delivery operational activities. Table J stores the fuel factors calculated in Step 337 for each service product for pickup or delivery.

Calculation of Fuel Factors for Stationary Operational Activities

The embodiments of the fuel factor calculation module 300 described above recite steps performed by the fuel factor calculation module 300 for calculating fuel factors that may be used to estimate the amount of fuel used by the carrier to perform mobile operational activities, such as transporting packages from between carrier facilities, between the origin address and an origin carrier facility, and between a destination carrier facility and the destination address. However, according to various embodiments, the fuel factor calculation module 300 may further be configured for calculating fuel factors related to stationary operational activities, such as movement and processing of a package volume (or weight) through each carrier facility (or type of carrier facility).

In particular, according to various embodiments, the fuel factor calculation module 300 calculates a fuel factor for a stationary operation activity by first retrieving (1) a total amount of fuel used by all (or a portion of) the carrier's facilities during the particular time period and (2) a total number of packages, volume of packages, and/or weight of packages transported by the carrier during the time period. Then, the fuel factor calculation module 300 divides the total amount of fuel retrieved by the total number of packages, volume of packages, or weight of packages retrieved. This quotient is the fuel factor associated with movement of a package through each carrier facility. In other embodiments, instead of (or in addition to) retrieving the total number of packages, volume of packages, and/or weight of packages, the fuel factor calculation module 300 may retrieve the total revenue (and/or total number of invoices) associated with transporting packages during the particular time period, and the fuel factor may be the quotient of the total amount of fuel divided by the total revenue (or total number of invoices) retrieved.

In various other embodiments, the fuel factor calculation module 300 is configured for calculating a fuel factor for each carrier facility. In particular, the fuel factor calculation module 300 retrieves the total amount of fuel used at each carrier facility during a particular time period and the total number of packages (and/or volume or weight of packages) that were transported through each facility during the particular time period. The fuel factor calculation module 300 then calculates a fuel factor for each facility by dividing the total amount of fuel retrieved by the total number of packages (and/or volume or weight of packages) retrieved. In other embodiments, instead of (or in addition to) retrieving the total number of packages, volume of packages, and/or weight of packages, the fuel factor calculation module 300 may retrieve the total revenue (and/or total number of invoices) associated with transporting packages through each carrier facility during the particular time period, and the fuel factor may be the quotient of the total amount of fuel divided by the total revenue (or total number of invoices) retrieved.

Emissions Factor Calculation Module

The emissions factor calculation module 600 according to various embodiments calculates an emissions factor based on each fuel factor calculated by the fuel factor calculation module 300. For example, in certain embodiments, for transport operational activities, each emissions factor may be expressed as an amount of emissions (e.g., lbs. or kg of $CO_2$) per volume (or weight) of package transported, and for pickup or delivery operational activities, each emissions factor may be expressed as an amount of emissions per stop. In certain embodiments, the amount of emissions expressed in the calculated emissions factors is an amount of emissions by weight, but in other embodiments, the module 600 may calculate the amount of emissions in other acceptable units.

FIG. 10 illustrates the steps executed by the emissions factor calculation module 600 according to various embodiments for calculating an amount of emissions per cube. Beginning at Step 601, the emissions factor calculation module 600 retrieves one or more of the fuel factors calculated by the fuel factor calculation module 300. Then, in Step 603, for each retrieved fuel factor, the module 600 calculates an amount of emissions corresponding to each fuel factor by multiplying the fuel factor by an amount of energy per amount of fuel (e.g., Gigajoules of energy per gallon of fuel) and by an amount of emissions per amount of energy (e.g., kilograms or pounds of emissions per Gigajoule). The amount of energy per amount of fuel and the amount of emissions per amount of energy are known standards. For example, in one embodiment, the emission factor module 600 calculates the weight of carbon dioxide emitted per package volume ("cube") (or weight) for transport operational activities by executing the following formula:

$$\left(\frac{\text{Liters of Fuel Used}}{\text{Cube}}\right) \times \left(\frac{\text{Gigajoules}}{\text{Liters of Fuel}}\right) \times \left(\frac{\text{Kilograms of } CO_2}{\text{Gigajoule}}\right) = \frac{\text{Kilograms of } CO_2 \text{ Emitted}}{\text{Cube}}$$

Similarly, the emissions factor module 600 calculates the weight of carbon dioxide emitted per stop for pickup and delivery operational activities by executing the following formula:

$$\left(\frac{\text{Liters of Fuel Used}}{\text{Stop}}\right) \times \left(\frac{\text{Gigajoules}}{\text{Liters of Fuel}}\right) \times \left(\frac{\text{Kilograms of } CO_2}{\text{Gigajoule}}\right) = \frac{\text{Kilograms of } CO_2 \text{ Emitted}}{\text{Stop}}$$

According to various embodiments, the emissions factor calculation module 600 may send the data it retrieves and/or calculates to the active emissions calculation database 33 after each step described above or only after Step 603.

In the example described above, the module 600 calculates an amount of carbon dioxide emitted per package volume (or weight) resulting from a particular operational activity of the carrier, but in other various embodiments, the module 600 may calculate emissions factors associated with other types of emissions, such as, for example, methane ($CH_4$), nitrous oxide ($N_2O$), hydrofluorocarbons (HFCs), perfluorocarbons (PFCs), and sulfur hexafluoride ($SF_6$).

In various embodiments, the emissions factor calculation module 600 is further configured for calculating emissions resulting from stationary operational activities. In certain embodiments, the emissions factor calculation module 600 calculates emissions factors based on the fuel factors calculated by the fuel factor calculation module 300 as described above. However, in other various embodiments, the emissions factor calculation module 600 calculates one or more emissions factors based on a total amount of emissions resulting from operations of carrier facilities during a particular time period.

In particular, according to various embodiments, the emissions factor calculation module 600 calculates an emissions factor for a stationary operational activity by first retrieving (1) a total amount of emissions resulting from operation of all (or a portion of) the carrier's facilities during the particular time period and (2) a total number of packages, volume of packages, and/or weight of packages transported by the carrier during the time period. Then, the emissions factor calculation module 600 divides the total amount of emissions retrieved by the total number of packages, volume of packages, or weight of packages retrieved. This quotient is the emissions factor associated with movement of a package through each carrier facility. In other embodiments, instead of (or in addition to) retrieving the total number of packages, volume of packages, and/or weight of packages, the emissions factor calculation module 600 may retrieve the total revenue (and/or total number of invoices) associated with transporting packages during the particular time period, and the emissions factor may be the quotient of the total amount of emissions divided by the total revenue (or total number of invoices) retrieved.

In various other embodiments, the emissions factor calculation module 600 is configured for calculating an emissions factor associated with each carrier facility. In particular, the emissions factor calculation module 600 retrieves the total amount of emissions resulting from operations at each carrier facility during a particular time period and the total number of packages (and/or volume or weight of packages) that were transported through each facility during the particular time period. The emissions factor calculation module 600 then calculates an emissions factor for each facility by dividing the total amount of emissions retrieved by the total number of packages (and/or volume or weight of packages) retrieved. In other embodiments, instead of (or in addition to) retrieving the total number of packages, volume of packages, and/or weight of packages, the emissions factor calculation module 600 may retrieve the total revenue (and/or total number of invoices) associated with transporting packages through each carrier facility during the particular time period, and the emissions factor may be the quotient of the total amount of emissions divided by the total revenue (or total number of invoices) retrieved. According to certain embodiments, the total amount of emissions for each facility may be determined using E-Grid or other smart grid technology software that provides an estimated (or actual) amount of energy (or fuel) used based on the location of the facility (e.g., postal zip code, region, state, etc.).

Emissions Calculation Module

The emissions calculation module 400 according to various embodiments is configured for calculating an amount of emissions (or estimated amount) resulting from the transportation of a particular shipment through the carrier's transportation network. FIG. 11 illustrates an embodiment of the emissions calculation module 400. Beginning at Step 401, the emissions calculation module 400 retrieves one or more emissions factors for each operational activity associated with the particular shipment and at least a portion of the shipment parameters associated with the particular shipment. For example, using the exemplary shipment 800 shown in FIG. 6, if the particular shipment is a letter shipped via second day delivery service level by a commercial customer that has daily pickups by the carrier, the emissions calculation module 400 retrieves (1) the pickup operational activity emissions factor associated second day delivery letter service products shipped by commercial customers having daily pickup, (2) the delivery operational activity emissions factor associated second day delivery letter service products shipped by commercial customers, (3) one or more transport operational activity emissions factors associated with second day delivery, and (4) one or more stationary operational activity emissions factors associated with processing and sorting at each carrier facility and movement of the particular shipment between the airports and the regional facilities located near each airport.

Next, in Step 403, the module 400 calculates an amount of emissions corresponding to the particular shipment for non-pickup and delivery operational activities. For example, the module 400 calculates the amount of emissions corresponding to the transport operational activity by multiplying the volume of the shipment (e.g., cubic feet) by each volume-based transport operational activity emissions factor. In other embodiments in which the emissions factors are weight-based, the amount of emissions corresponding to the particular shipment is calculated by multiplying the weight of the shipment by each weight-based emissions factor. And, in embodiments in which the emissions factors are based on number of packages, revenue, or invoices, the amount of emissions corresponding to the particular shipment is calculated by multiplying the number of packages in the shipment, the cost of transporting the shipment, or the number of invoices associated with the shipment, respectively.

For pickup and delivery operational activities, according to various embodiments, the emissions calculation module 400 calculates the amount of emissions based on the average daily pickup or delivery volume for each customer (or account associated with each customer). As shown in FIG. 11, to calculate the amount of emissions for a pickup operational activity, the module 400 proceeds to Step 410 shown in FIG. 13 (Step 404 in FIG. 11), and to calculate the amount of emissions for a delivery operational activity, the module 400 proceeds to Step 450 shown FIG. 14 (Step 406 in FIG. 11). After the amount of emissions for the pickup and delivery operational activities have been calculated, the module 400 sums together the emissions calculated for each operational activity to calculate the total emissions for the particular shipment, as shown in Step 408 of FIG. 11.

In particular, in the embodiment shown in FIG. 13, with respect to a pickup operational activity for a particular shipment, the emissions calculation module 400 retrieves an average number of packages (or volume or weight of packages) picked up per day for the customer (or the account associated with the customer) by the carrier at Step 410. In certain embodiments, the module 400 retrieves the average number of packages for the particular service level associated with the shipment or the service product associated with the shipment. In addition, the average number of packages retrieved may be received by the system 5 from the customer or retrieved based on historical shipment data associated with the customer that has been previously stored by the transportation entity server 200.

Next, in Step 412, the average number of packages retrieved in Step 410 is multiplied by the average volume (or weight) per package associated with the customer. In alternative embodiments, the average number of packages retrieved may be multiplied by the average volume (or weight) per package associated with the service level of each package. In one alternative embodiment, the average volume (or weight) is customer-specific (average volume or weight per package for all pickups for the customer at the particular service level).

Then, in Step 414, the product from Step 412 is divided by the average total volume associated with a pickup/delivery truck. In certain embodiments, the average total volume associated with the pickup/delivery truck depends on the type of pickup/delivery truck expected to pickup the particular shipment and may vary over time as characteristics of packages change.

If the quotient from Step 414 is less than or equal to one, then the emissions calculation module 400 treats the pickup of the particular shipment as being performed (or will be performed) by a small or large pickup/delivery truck, and if the quotient from Step 414 is greater than one, then the emissions calculation module 400 treats the pickup of the particular shipment as being performed by a larger tractor trailer. In particular, if the quotient from Step 414 is less than or equal to one, the emissions calculation module 400 proceeds to Step 416 and retrieves the pickup emissions factor associated with the particular service product (or service level) calculated by the emissions factor calculation module 600 for a small or large pickup/delivery truck. Next, in Step 418, the pickup emissions factor retrieved in Step 416 is divided by the average number of packages retrieved in Step 410. Then, in Step 420, the average volume per package is retrieved. For example, in one embodiment, the average volume per package may be retrieved from a table that associates an average weight per package with the average volume per package, and the average weight per package may be determined by dividing the total weight by the total number of packages. In various other embodiments, the average volume is determined on a daily basis (e.g., average volume for all of the customer's shipments shipped on a particular day), on a per service level basis (e.g., average volume for all of the customer's shipments being shipped via a particular service level), or on a per origin/destination level (e.g., average volume for all of the customer's shipments being shipped between a particular origin and destination). In Step 422, the total volume per shipment is calculated by multiplying the average volume per shipment retrieved in Step 420 by the number of packages per shipment. The module 400 then proceeds to Step 424 in which the total volume per shipment is multiplied by the quotient from Step 418 to calculate the amount of emissions per package.

If the quotient from Step 414 is greater than one, the emissions calculation module 400 proceeds to Step 426 and rounds the quotient from Step 414 to the next highest integer. Then, in Step 428, the pickup emissions factor associated with the particular service product (or service level) for a tractor trailer is retrieved. Next, in Step 430, the pickup emissions factor retrieved in Step 428 is divided by the average number of packages retrieved in Step 410. Then, in Step 432, the average volume per shipment is retrieved. In various other embodiments, the average volume is determined on a daily basis (e.g., average volume for all of the customer's shipments shipped on a particular day), on a per service level basis (e.g., average volume for all of the customer's shipments being shipped via a particular service level), or on a per origin/destination level (e.g., average volume for all of the customer's shipments being shipped between a particular origin and destination). In Step 434, the total volume per shipment is calculated by multiplying the average volume per shipment retrieved in Step 432 by the number of packages per shipment. The module 400 then proceeds to Step 436 in which the total volume per shipment is multiplied by the quotient from Step 430 to calculate the amount of emissions per package.

FIG. 14 illustrates an embodiment of steps performed by the emissions calculation module 400 in calculating the amount of emissions resulting from a delivery operational activity for the particular shipment. In particular, with respect to a delivery operational activity for a particular shipment, the emissions calculation module 400 retrieves an average number of packages (or volume or weight of packages) delivered per day to the customer (or the account associated with the customer) by the carrier at Step 450. In certain embodiments, the module 400 retrieves the average number of packages for the particular service level associated with the shipment or the service product associated with the shipment. In addition, the average number of packages retrieved may be received by the system 5 from the customer or retrieved based on historical shipment data associated with the customer that has been previously stored by the transportation entity server 200.

Next, in Step 452, the total number of packages retrieved in Step 450 is multiplied by the average volume (or weight) per package associated with the customer. In alternative embodiments, the total number of packages retrieved may be multiplied by the average volume (or weight) per package associated with the service level of each package. In one alternative embodiment, the average volume (or weight) is customer-specific (average volume or weight per package for all deliveries for the customer at the particular service level).

Then, in Step 454, the product from Step 452 is divided by the average total volume associated with a pickup/delivery truck. In certain embodiments, the average total volume associated with the pickup/delivery truck depends on the type of pickup/delivery truck expected to deliver the particular shipment and may vary over time as characteristics of packages change.

If the quotient from Step 454 is less than or equal to one, then the emissions calculation module 400 treats the delivery of the particular shipment as being performed (or will be performed) by a small or large pickup/delivery truck, and if the quotient from Step 454 is greater than one, then the emissions calculation module 400 treats the delivery of the particular shipment as being performed by a larger tractor trailer. In particular, if the quotient from Step 454 is less than or equal to one, the emissions calculation module 400 proceeds to Step 456 and retrieves the delivery emissions factor associated with the particular service product (or service level) calculated by the emissions factor calculation module 600 for a small or large pickup/delivery truck. Next, in Step 458, the delivery emissions factor retrieved in Step 456 is divided by the average number of packages retrieved in Step 450. Then, in Step 460, the average volume per package is retrieved. For example, in one embodiment, the average volume per package may be retrieved from a table that associates an average weight per package with the average volume per package, and the average weight per package may be determined by dividing the total weight by the total number of packages. In various other embodiments, the average volume is determined on a daily basis (e.g., average volume for all of the customer's shipments shipped on a particular day), on a per service level basis (e.g., average volume for all of the customer's shipments being shipped via a particular service level), or on a per origin/destination level (e.g., average volume for all of the customer's shipments being shipped between a particular origin and destination). In Step 462, the total volume per shipment is calculated by multiplying the average volume per shipment retrieved in Step 460 by the number of packages per shipment. The module 400 then proceeds to Step 464 in which the total volume per shipment is multiplied by the quotient from Step 458 to calculate the amount of emissions per package.

If the quotient from Step 454 is greater than one, the emissions calculation module 400 proceeds to Step 466 and rounds the quotient from Step 454 to the next highest integer. Then, in Step 468, the delivery emissions factor associated with the particular service product (or service level) for a tractor trailer is retrieved. Next, in Step 470, the delivery emissions factor retrieved in Step 468 is divided by the average number of packages retrieved in Step 450. Then, in Step 472, the average volume per shipment is retrieved. In various other embodiments, the average volume is determined on a daily basis (e.g., average volume for all of the customer's shipments shipped on a particular day), on a per service level basis (e.g., average volume for all of the customer's shipments being shipped via a particular service level), or on a per origin/destination level (e.g., average volume for all of the customer's shipments being shipped between a particular origin and destination). In Step 474, the total volume per shipment is calculated by multiplying the average volume per shipment retrieved in Step 470 by the number of packages per shipment. The module 400 then proceeds to Step 476 in which the total volume per shipment is multiplied by the quotient from Step 470 to calculate the amount of emissions per package. According to various other embodiments, Steps 410 through 470 described above as being performed by emissions calculation module 400 can be used with the fuel factors calculated by module 300 to calculate an amount of fuel used per package.

The resulting amounts of emissions calculated from each emissions factor are then summed together to calculate a total amount of emissions estimated for transportation of the shipment through the carrier's transportation network.

Reporting Module

The reporting module 500 is configured to report the calculated amount of emissions to the user. FIG. 12 illustrates an exemplary flow of the steps executed by the reporting module 500 according to various embodiments. Beginning at Step 501, the reporting module 500 receives from the emissions calculation module 400 the amount of emissions resulting from transporting the particular shipment. Next at Step 502, the reporting module 500 generates a report for the user based on the data received or retrieved in Step 501, which may include, but is not limited to, the total amount of carbon dioxide and/or other emissions resulting from transporting the shipment or the amounts resulting from each operational activity (or groups thereof). This data may be further be organized by each service level and/or service product, each type of shipment vehicle, and by specific groups of packages, for example. In addition, in various embodiments, the report generated by the reporting module 500 may include the results of any of the calculations described above in relation to the fuel factor calculation module 300, the carbon factor calculation module 600, or the carbon calculation module 400, including, for example, the amount of fuel estimated (or actually) used for transporting a particular shipment or used to perform one or more operational activities.

CONCLUSION

Many modifications and other embodiments of the invention will come to mind to one skilled in the art to which this invention pertains having the benefit of the teachings presented in the foregoing descriptions and the associated drawings. Accordingly, it is to be understood that the invention is not to be limited to the specific embodiments disclosed and that modifications and other embodiments are intended to be included within the scope of the invention. Although specific terms are employed herein, they are used in a generic and descriptive sense only and not for the purposes of limitation.

The invention claimed is:

1. An emissions calculation system for calculating emissions resulting from transporting a shipment from an origin address to a destination address through a carrier's transportation network, the emissions calculation system comprising at least one computer processor and a memory, said at least one computer processor configured for:
   receiving at least a portion of shipment parameters associated with a particular shipment, the received shipment parameters comprising an origin address and a destination address for the particular shipment;
   identifying a transportation route along which the particular shipment is expected to travel from the origin address to the destination address;
   retrieving one or more emissions factors related to at least one of the shipment parameters, each of the one or more emissions factors being based at least in part on an amount of fuel used during a particular time period by the carrier to transport previously shipped packages along at least a portion of the transportation route; and
   estimating an amount of emissions resulting from transporting the particular shipment along the at least a portion of the transportation route based at least in part on the one or more retrieved emissions factors and at least a portion of the shipment parameters.

2. The emissions calculation system of claim 1, wherein the at least one computer processor is further configured for estimating the amount of fuel used during the particular time period to transport packages along the at least a portion of the transportation route based at least in part on an expected amount of time for transporting the packages along the at least a portion of the transportation route, the expected amount of time based on historical shipment data of the carrier.

3. The emissions calculation system of claim 2, wherein the expected amount of time is associated with a distance range that includes a distance of the at least a portion of the transportation route, and the amount of fuel is further based on the number of packages transported within the distance range by the carrier during the particular time period.

4. The emissions calculation system of claim 3, wherein the expected amount of time is further based on a service level associated with the packages, the service level in part indicating the transportation route along which the packages travel, one or more modes of transportation for transporting the packages along the transportation route, the expected amount of time for transporting the packages, and an average volume per package transported via the service level.

5. The emissions calculation system of claim 2, wherein the transportation route comprises one or more route legs, and wherein the expected amount of time is associated with transporting packages along a particular route leg, and the amount of fuel is further based on the number of packages transported along the route leg by the carrier during the particular time period.

6. The emissions calculation system of claim 5, wherein the expected amount of time is further based on a service level associated with the packages, the service level in part indicating the transportation route along which the packages travel, a mode of transportation for transporting the packages along each route leg, the expected amount of time for transporting the packages along each route leg, and an average volume per package transported via the service level.

7. The emissions calculation system of claim 1, wherein:
   the transportation route comprises a first route leg from the origin address to a first carrier facility, a second route leg between the first carrier facility and a second carrier facility, and a third route leg from the second carrier facility to the destination address,
   a transport operational activity comprises transporting the particular shipment along the second route leg, and a transport emissions factor of the one or more retrieved emissions factors is associated with the transport operational activity,
   a pickup operational activity comprises transporting the particular shipment along the first route leg, and a pickup emissions factor of the one or more retrieved emissions factors is associated with the pickup operational activity, and
   a delivery operational activity comprises transporting the particular shipment along the second route leg, and a delivery emissions factor of the one or more retrieved emissions factors is associated with the delivery operational activity.

8. The emissions calculation system of claim 7, wherein the transport operational activity further comprises transporting the particular shipment through at least one intermediate carrier facility located between the first carrier facility and the second carrier facility.

9. The emissions calculation system of claim 7, wherein the particular shipment is associated with a first service product, and the pickup emissions factor is based at least in part on the amount of fuel per stop previously used by the carrier for picking up packages associated with the first service product.

10. The emissions calculation system of claim 7, wherein the particular shipment is associated with a first service product, and the delivery emissions factor is based at least in part on the amount of fuel per stop previously used by the carrier for delivering packages associated with the first service product.

11. The emissions calculation system of claim 7, wherein the one or more retrieved emissions factors further comprises a stationary operational activities emissions factor associated with one or more stationary operational activities.

12. The emissions calculation system of claim 1, wherein estimating the amount of emissions comprises estimating an amount of carbon dioxide.

* * * * *